(12) United States Patent
Henry et al.

(10) Patent No.: US 12,513,108 B2
(45) Date of Patent: *Dec. 30, 2025

(54) SEAMLESS MAC ADDRESS ROTATION IN MULTI-LINK DEVICE USING MULTIPLE IP STACKS

(71) Applicant: Cisco Technology, Inc., San Jose, CA (US)

(72) Inventors: Jerome Henry, Pittsboro, NC (US); Robert Edgar Barton, Richmond (CA); Stephen Michael Orr, Wallkill, NY (US); Malcolm Muir Smith, Richardson, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/591,198

(22) Filed: Feb. 29, 2024

(65) Prior Publication Data
US 2024/0259340 A1   Aug. 1, 2024

Related U.S. Application Data

(63) Continuation of application No. 17/731,335, filed on Apr. 28, 2022, now Pat. No. 11,991,144.

(51) Int. Cl.
*H04L 61/2596* (2022.01)
*H04L 61/251* (2022.01)
(Continued)

(52) U.S. Cl.
CPC ........ *H04L 61/2596* (2013.01); *H04L 61/251* (2013.01); *H04L 61/5069* (2022.05); *H04L 69/14* (2013.01)

(58) Field of Classification Search
CPC ............... H04L 61/2596; H04L 61/251; H04L 61/5069; H04L 69/14; H04L 61/4511;
(Continued)

(56) References Cited

U.S. PATENT DOCUMENTS

| 9,264,353 B2 | 2/2016 | Krishnaswamy et al. |
| 10,757,146 B2 | 8/2020 | Annamalaisami et al. |

(Continued)

FOREIGN PATENT DOCUMENTS

| WO | 2012068854 A1 | 5/2012 |
| WO | 2021063244 A1 | 4/2021 |

OTHER PUBLICATIONS

Wisnu Murti, et al, "Multi-Link Operation with Enhanced Synchronous Channel Access in IEEE 802.11be Wireless LANs: Coexistence Issue and Solutions," MDPI, Sensors, https://doi.org/10.3390/s21237974, Nov. 29, 2021, 24 pages.

(Continued)

*Primary Examiner* — Shawn D Miller
(74) *Attorney, Agent, or Firm* — Edell, Shapiro & Finnan, LLC

(57) ABSTRACT

A method comprising: at a multi-link device (MLD) configured for multi-link operation: establishing a first Internet Protocol (IP) stack of a first IP type and configured with a first IP address of the first IP type, wherein the first IP stack is associated to a first MLD media access control (MAC) address of a first station of the MLD; establishing a second IP stack of a second IP type and configured with a second IP address of the second IP type, wherein the second IP stack exists concurrently with the first IP stack and is associated to a second MLD MAC address of a second station of the MLD; and exchanging, with a peer MLD, IP traffic using one
(Continued)

or more of (i) the first IP stack and the first MLD MAC address, and (ii) the second IP stack and the second MLD MAC address.

20 Claims, 11 Drawing Sheets

(51) Int. Cl.
*H04L 61/5069* (2022.01)
*H04L 69/14* (2022.01)

(58) Field of Classification Search
CPC ........... H04L 61/5038; H04L 2101/622; H04L 2101/677
See application file for complete search history.

(56) References Cited

U.S. PATENT DOCUMENTS

| | | |
|---|---|---|
| 11,063,639 B1 | 7/2021 | Legg et al. |
| 2005/0249213 A1 | 11/2005 | Higuchi et al. |
| 2016/0255551 A1 | 9/2016 | Susitaival et al. |
| 2017/0163539 A1 | 6/2017 | Sreeramoju et al. |
| 2020/0229071 A1 | 7/2020 | Ansley et al. |
| 2020/0344203 A1 | 10/2020 | Mermoud et al. |
| 2020/0351648 A1 | 11/2020 | Fang |
| 2021/0076437 A1 | 3/2021 | Kneckt et al. |
| 2021/0314292 A1* | 10/2021 | Seok ..................... H04W 72/53 |
| 2021/0337613 A1 | 10/2021 | Seok et al. |
| 2021/0377856 A1 | 12/2021 | Chu et al. |
| 2022/0039180 A1* | 2/2022 | Mukherjee ............ H04W 76/15 |
| 2022/0086627 A1* | 3/2022 | Montemurro ........... H04L 61/25 |
| 2022/0255831 A1* | 8/2022 | Wang .................. H04L 41/0893 |

OTHER PUBLICATIONS

C. Wood et al., "Linkable Identifiers", draft-wood-linkable-identifiers-01, Network Working Group, Apr. 24, 2019, 9 pages.
A. Ford et al., "TCP Extensions for Multipath Operation with Multiple Addresses", Internet Engineering Task Force (IETF), Request for Comments: 6824, ISSN: 2070-1721, Jan. 2013, 64 pages.
J. Henry et al., "Randomized and Changing MAC Address Use Cases", draft-henry-madinas-framework-03, Internet Engineering Task Force, Oct. 24, 2021, 15 pages.

* cited by examiner

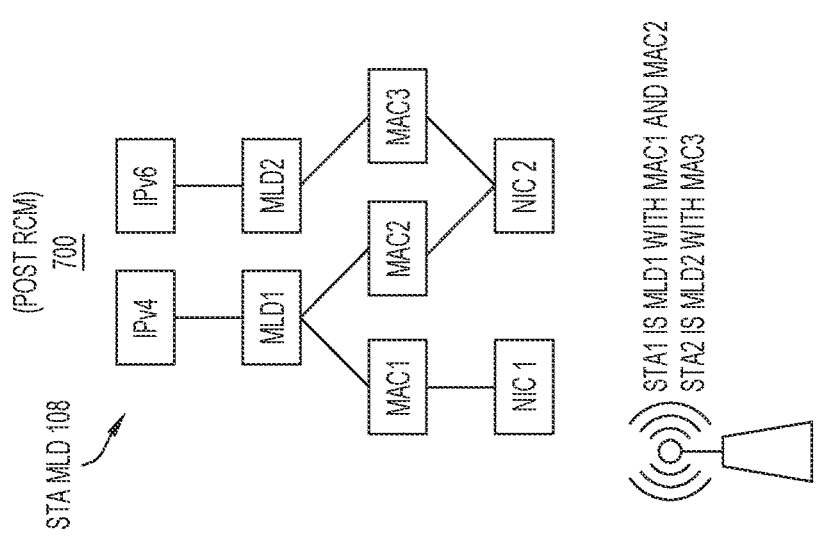
FIG.7
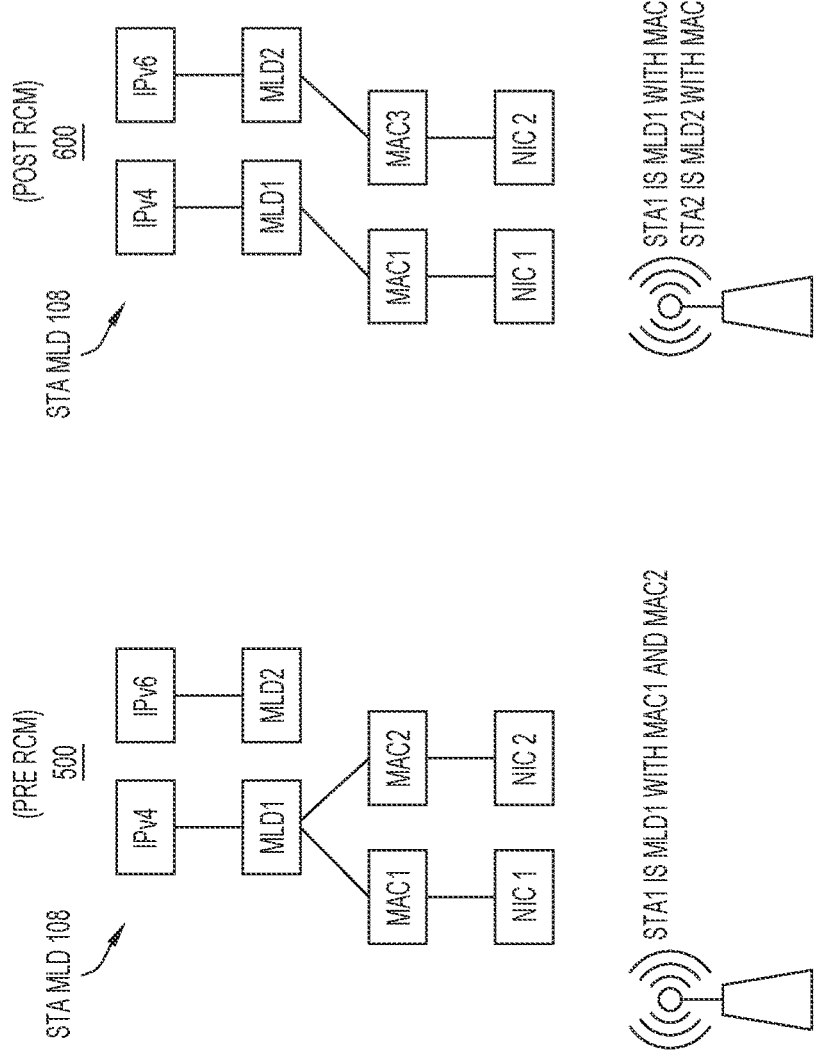
FIG.6
FIG.5

SEAMLESS MAC ADDRESS ROTATION IN MULTI-LINK DEVICE USING MULTIPLE IP STACKS

CROSS-REFERENCE TO RELATED APPLICATIONS

This application is a continuation of U.S. application Ser. No. 17/731,335, filed Apr. 28, 2022, now U.S. Pat. No. 11,991,144, which is incorporated herein by reference in its entirety.

TECHNICAL FIELD

The present disclosure relates to secure networking.

BACKGROUND

The Wi-Fi® wireless networking technology (hereinafter "Wi-Fi") and underlying standard, IEEE 802.11, describes multi-link operation (MLO) in which a wireless station (STA) or client device establishes a primary connection to an access point (AP) multi-link device (MLD) using a core media access control (MAC) address, and declares one or more interfaces with an MLD MAC address to establish data communication to one or more AP radios. Similarly, many Wi-Fi 6 devices implement a pre-standard (STD) variant of MLO referred to as "dual-STA," which lacks the MLD MAC address. The aforementioned conventional structures/ configurations are not efficient in a randomized and changing MAC (RCM) address (referred to as "RCM") context and can cause problems. For example, using standard MLO (or pre-STD dual-STA operation), the STA disassociates its MLD (logical entity) from existing connections during RCM, thus breaking connection continuity.

In the aforementioned configurations, the MLD sits below an Internet Protocol (IP) layer. As a result, a STA may obtain an IP version (v) 4 (IPv4) address, or an IPv6 address, but both IP protocols relate to or are associated with the same MLD MAC address (for the MLD). Similarly, the pre-STD dual-STA implementation obtains two IP addresses using the same MAC address (or STA identifier). This forces the MLD to split traffic between physical interfaces associated to the one MLD MAC address and their associated physical (i.e., link) MAC addresses, which is inefficient for RCM and privacy. For example, when the STA rotates its MAC address, the STA changes its MLD, which causes the STA to obtain new IPv4/v6 addresses, or renew them. This is disruptive to existing STA communications sessions.

BRIEF DESCRIPTION OF THE DRAWINGS

FIG. 5 shows an initial configuration of components of the STA MLD, prior to RCM, according to an example embodiment.

FIG. 6 shows a configuration of the components of the STA MLD, after RCM, according to an example embodiment.

FIG. 7 shows the components of the STA MLD after another RCM, according to an example embodiment.

DESCRIPTION OF EXAMPLE EMBODIMENTS

Overview

Figure 1:
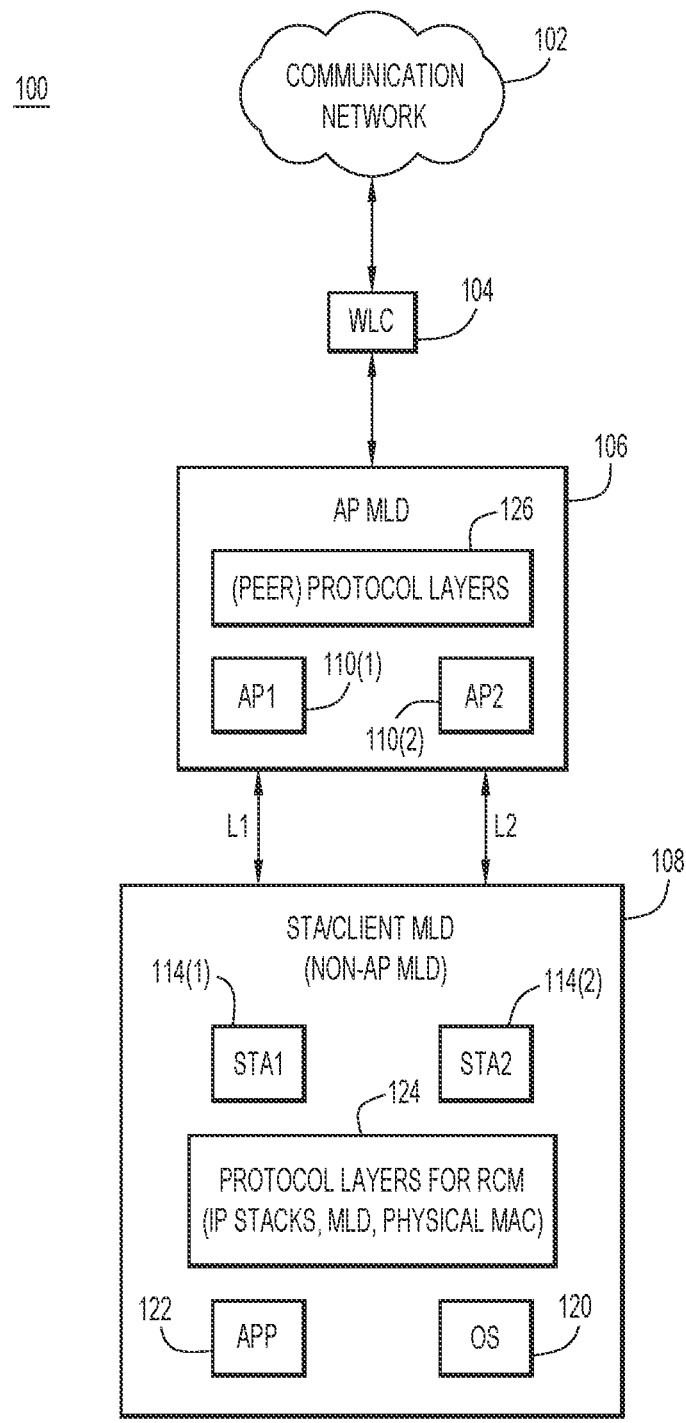
FIG. 1 is a block diagram of a network environment in which multi-link operation (MLO) using multi-link devices (MLDs) configured to support randomized and changing media access control (MAC) (RCM) address (referred to as "RCM") operations may be implemented, accordance to an example embodiment.

In an embodiment, a method comprises: at a multi-link device (MLD) configured for multi-link operation: establishing a first Internet Protocol (IP) stack of a first IP type and configured with a first IP address of the first IP type, wherein the first IP stack is associated to a first MLD media access control (MAC) address of a first station of the MLD; establishing a second IP stack of a second IP type and configured with a second IP address of the second IP type, wherein the second IP stack exists concurrently with the first IP stack and is associated to a second MLD MAC address of a second station of the MLD; and exchanging, with a peer MLD, IP traffic using one or more of (i) the first IP stack and the first MLD MAC address, and (ii) the second IP stack and the second MLD MAC address.

In another embodiment, a method comprises: at a multi-link device (MLD) configured for multi-link operation: establishing a first Internet Protocol (IP) stack configured with a first IP address that is associated to a first MLD media access control (MAC) address of a first station of the MLD; establishing a second IP stack that exists concurrently with the first IP stack and is configured with a second IP address associated to a second MLD MAC address of a second station of the MLD; and by a multi-link proxy layer having interfaces to the first IP stack and the second IP stack, forwarding data traffic between an application and a peer MLD using one or more of (i) the first IP stack and the second MLD MAC address, and (ii) the second IP stack and the second MLD MAC address.

EXAMPLE EMBODIMENTS

Multi-link operation (MLO) is a feature of IEEE 802.11be extremely high throughput (EHT) (i.e., Wi-Fi 7) that enables the utilization of multiple links using individual frequency channels to transmit and receive between EHT devices. MLO enables the EHT devices to use multiple wireless links in different bands simultaneously for transmission and reception. An EHT device capable of MLO is also called a multi-link device (MLD). As described below, an MLD is affiliated with multiple wireless stations (STAs), each capable of establishing a link with a peer wireless station (STA). An AP MLD represents an EHT device that includes multiple affiliated STAs, where each STA is an access point (AP). A non-AP MLD, also referred to as a "client MLD" or "STA MLD," represents an EHT device that includes multiple affiliated STAs, where each STA is a non-AP (client) STA. Depending on context, the MLD and its associated STAs may be considered logical entities or components, but may also encompass physical devices/entities or components.

Embodiments presented herein are directed to randomized and changing MAC (RCM) address (referred to simply as "RCM") in the context of MLDs configured for multi-link operation. The embodiments are divided into two groups, including (i) embodiments directed to seamless MAC address rotation in the MLD context by leveraging a multiple stack capability of a client/STA MLD (referred to as "multi-stack embodiments"), describe in connection with FIGS. 1-8, and (ii) embodiments directed to augmentation of a multi-link proxy to support MLDs (in a STA MLD) to allow IP-specific transparent RCM (referred to as "proxy embodiments"), described in connection with FIGS. 1, 2 and 9-16.

With reference to FIG. 1, there is a block diagram of a network environment 100 in which MLO using MLDs configured to support RCM may be implemented. Network environment 100 includes a communication network 102, a wireless local area network (LAN) (WLAN) controller (WLC) 104, an AP MLD 106 (an EHT device), and a non-AP (i.e., "STA") MLD 108 (which is also an EHT device). Communication network 102 may include one or more wide area networks (WANs), such as the Internet, and one or more LANs. WLC 104 communicates with communication network 102 and AP MLD 106, and controls the AP MLD 106, over wired or wireless communication links. AP MLD 106 includes multiple affiliated APs 110(1) (AP1) and 110(2) (AP2). STA MLD 108 includes multiple affiliated STAs 114(1) (STA1) and 114(2) (STA2). In performing MLO, AP MLD 106 and STA MLD 108 may establish multiple concurrent wireless connections or links L1 and L2 with each other, as shown. For example, STA1 and STA2 may establish links L1 and L2 to AP1 and AP2, respectively. In addition, STA1 may establish another link to AP2, and so on. The links L1 and L2 may include Wi-Fi and/or cellular links (e.g., long term evolution (LTE), for example.

STA MLD 108 includes an operating system (OS) 120 (or multiple operating systems) and may host (or otherwise have access to) one or more applications (APP) 122, which may be user applications, for example. Applications 122 can establish communication sessions based on IPv4 and/or IPv6, or other types of the IP. In support of the communication sessions, OS 120 can establish or setup concurrent (i.e., parallel) IPv4 and IPv6 traffic flows that traverse communication protocol layers (referred to simply as "protocol layers") 124 established in STA MLD 108. Protocol layers 124 include, but are not limited to, IP, MLD, and physical MAC (or link) layers, for example. AP MLD 106 includes protocol layers 126 that are peers to protocol layers 124. Although shown separately, STA1 and STA2 may include or overlap with protocol layers 124. Embodiments presented herein configure protocol layers 124 with multiple IP stacks and associate each IP stack to a distinct MLD MAC address (e.g., one MLD MAC address per IP stack). In some embodiments, the IP stacks use different types of IP (i.e., different IP types) (e.g., one for IPv4 and one for IPv6), while in other embodiments the IP stacks may use the same IP types. This configuration of protocol layers 124 enables STA MLD 108 to perform seamless RCM rotation in an MLD context using the IP stacks and their associated, distinct, MLD MAC addresses, as will be described more fully below.

Embodiments for Seamless MAC Address Rotation in the MLD Context by Leveraging a Multiple Stack Capability of a Client/STA MLD (the "Multi-Stack" Embodiments)

Figure 2:
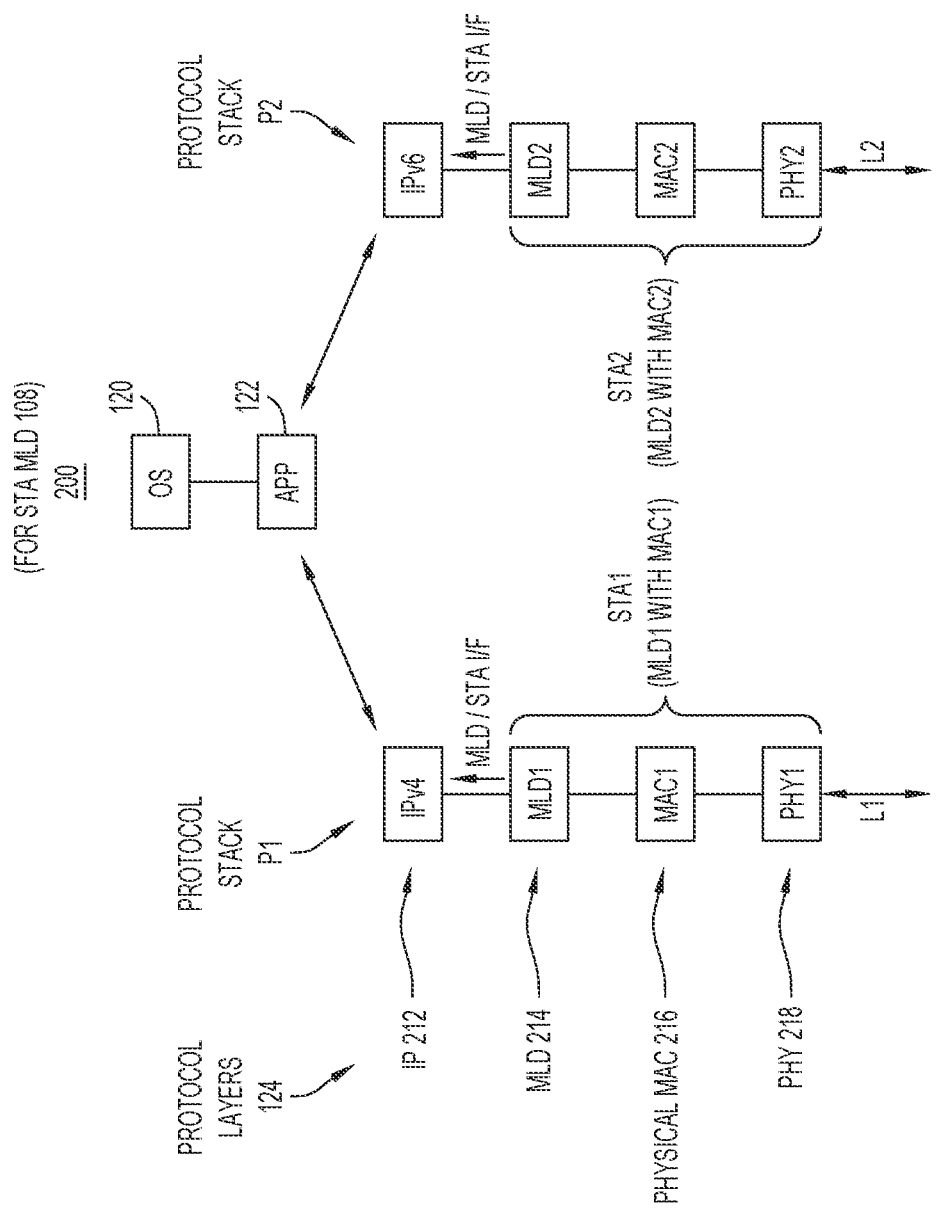
FIG. 2 shows components of a station (STA) MLD of FIG. 1 configured for MLO with RCM, according to an example embodiment.

The multi-stack embodiments are now described in connection with FIGS. 2-8. Referring first to FIG. 2, there is an illustration of an example configuration 200 of logical and/or physical entities/components implemented/configured on STA MLD 108 to achieve MLO with RCM. As mentioned above, STA MLD 108 includes OS 120 and applications 122. In an example, applications 122 may include a conferencing application, such as the WebEx® online meeting service, a web browser, and so on. STA MLD 108 further includes protocol layers 124 established and used by the STA MLD to exchange traffic originated by and destined for applications 122 with a peer MLD (e.g., AP MLD 106) over concurrent links L1 and L2. Protocol layers 124 include, from top-to-bottom, a network/IP layer 212 configured with multiple Layer 3 (L3) "IP stacks," an MLD 214 (i.e., an MLD layer), a physical MAC layer 216, and a physical layer (PHY) 218. Physical MAC layer 216 and PHY 218 comprise logical STAs, associated to/affiliated with corresponding MLD MAC addresses, as described below.

In the example of FIG. 2, IP layer 212 includes an IPv4 stack (labeled "IPv4" in FIG. 2) configured with an IPv4 address, and an IPv6 stack (labeled "IPv6" in FIG. 2) configured with an IPv6 address. An "IP stack" is an L3 (networking) logical entity having an identity (i.e., a network address) and other communication parameters that enable the IP stack to exchange frames/packets with a peer IP stack. The communication parameters include a stack type (e.g., IP4 or IPv6, or some other networking protocol, such as IPX, for example), and other optional elements, such as a gateway address and one or more addresses of important network service entities (e.g., a domain name system (DNS) server).

MLD 214 is a logical entity that has more than one affiliated logical STA (e.g., STA1 and STA2). The MLD supports reception and transmission of frames on more than one link concurrently, when more than one link is enabled. While the MLD may have more than one link enabled, in some cases, the MLD may have zero links enabled. The STA (e.g., STA1) is a logical entity that is addressable directly, i.e., the STA may be configured with a physical/link MAC address from which frames are to be sent.

MLD 214 is configured with a first MLD MAC addresses MLD1 associated or linked to the IPv4 stack (and its IPv4 address), and a second MLD MAC address MLD2 associated or linked to the IPv6 stack (and its IPv6 address). In other words, MLD 214 presents a first MLD interface (I/F) (by way of MLD MAC address MLD1) to the IPv4 stack, and presents a second MLD interface (by way of MLD MAC address MLD2) to the IPv6 stack. Associating/linking a distinct/different MLD MAC address to each type of IP stack in this manner provides the ability to perform seamless RCM, as described more fully below in connection with FIG. 5.

Physical MAC layer 216 is configured with a physical or link MAC address MAC1 bundled to/with MLD MAC address MLD1, and a link MAC address MAC2 bundled to/with MLD MAC address MLD2. Thus, each MLD MAC address (e.g., MLD1) represents a distinct MLD "bundle" that includes the MLD MAC address (e.g., MLD1) associated or linked to one or more link MAC addresses (e.g., MAC1) that are bundled under the MLD MAC address. In this context, an MLD MAC address can be thought of as a virtual MAC address that sits above one or more link MAC addresses that are bundled to the virtual MAC address. Traffic flows associated with multiple link MAC addresses that are bundled under the same virtual/MLD MAC address may be coalesced or split (on receive or transmit) at the level of the virtual/MLD MAC address. In the ensuing description, an MLD MAC address and a link MAC address may be referred to simply by their respective labels. For example, "MLD MAC address MLD1" and "link MAC address MAC1" may be referred to simply as "MLD1" and "MAC1," respectively.

In the example, each MLD bundle includes a single link MAC address bundled with or under the MLD MAC address. In another example, multiple link MAC addresses may be bundled under the same MLD MAC address. In yet another example, an MLD bundle may include zero link MAC addresses. An MLD MAC address bundled with one or more link MAC addresses configured on a STA is considered enabled, while an MLD MAC address that is not bundled with any link MAC address is not enabled. PHY 218 includes physical link interfaces (also referred to as "physical interfaces") PHY1 and PHY2 configured with link MAC addresses MAC1 and MAC2, respectively. PHY1 and PHY2 each represents a respective radio of STA MLD 108, a network interface card (NIC), and the like.

In the example of FIG. 2, the IPv4 stack, MLD1, MAC1, and PHY1 together comprise a first protocol stack P1 configured to exchange IPv4 traffic for one or more of applications 122 with a similar protocol stack of a peer AP MLD over link L1. In protocol stack P1, STA1 may be identified as "MLD1 with MAC1." Similarly, stack IPv6, MLD2, MAC2, and PHY2 together comprise a second protocol stack P2 configured to exchange IPv6 traffic for one or more of applications 122 with a similar protocol stack of the peer AP MLD over link L2. Also, STA2 is identified as "MLD2 with MAC2." In some embodiments, first protocol stack P1 and second protocol stack P2 (and their respective layers/entities as shown in FIG. 2) exist and operate concurrently, as do links L1 and L2.

In a transmit direction, applications 122 may send IPv4 traffic (i.e. packets or frames) down protocol stack P1 to link L1. In that case, the IPv4 stack encapsulates the traffic with its IPv4 address, and forwards the traffic to MLD 214. The MLD 214 encapsulates the traffic with MLD MAC address MLD1 associated/linked to the IPv4 stack, and forwards the traffic to STA1. STA1 encapsulates the traffic with link MAC address MAC1 associated to/bundled with MLD1. STA1 transmits the traffic over link L1 using PHY1. Concurrently, applications 122 may send IPv6 traffic down protocol stack P2 to link L2. In that case, the IPv6 stack encapsulates the traffic with its IPv6 address, and forwards the traffic to MLD 214. The MLD 214 encapsulates the traffic with MLD MAC address MLD2 associated to the IPv6 stack, and forwards the traffic to STA2. STA2 encapsulates the traffic with link MAC address MAC2 associated to/bundled with MLD2. STA2 transmits the traffic over link L2 using PHY2. Since MLD1 and MLD2 are both enabled over respective links L1 and L2, applications 122 may send the IPv4 traffic and the IPv6 traffic concurrently using respective protocol stacks P1 and P2. Alternatively, applications 122 may send only IPv4 traffic or only IPv6 traffic at any given time using the respective protocol stack.

In a receive direction, IPv4 traffic received by PHY1 over link L1 traverses protocol stack P1 in reverse (i.e., in the upward direction), to be delivered to applications 122. Similarly, IPv6 traffic received by PHY2 over link L2 traverses protocol stack P2 in the reverse direction, to be delivered to applications 122. In some cases, the applications can be the same for the two protocol stacks P1, P2, or the applications can be different for the two protocol stacks.

As used herein, the terms "associated," "linked," or "bundled" as applied to addresses (e.g., IP or MAC addresses) may be used synonymously. Generally, addresses may be considered associated/linked/bundled with each other when they share or are used in connection with a common protocol stack (e.g., P1) across protocol layers 124, although it is possible that the addresses may span multiple protocol stacks. In some examples, addresses may be associated (linked or bundled) to/with each other using a mapping structure, such as address pointers or a mapping table, by which the addresses are directly or indirectly mapped to each other, such that access to one of the addresses enables access to the other one of the addresses.

Figure 3:
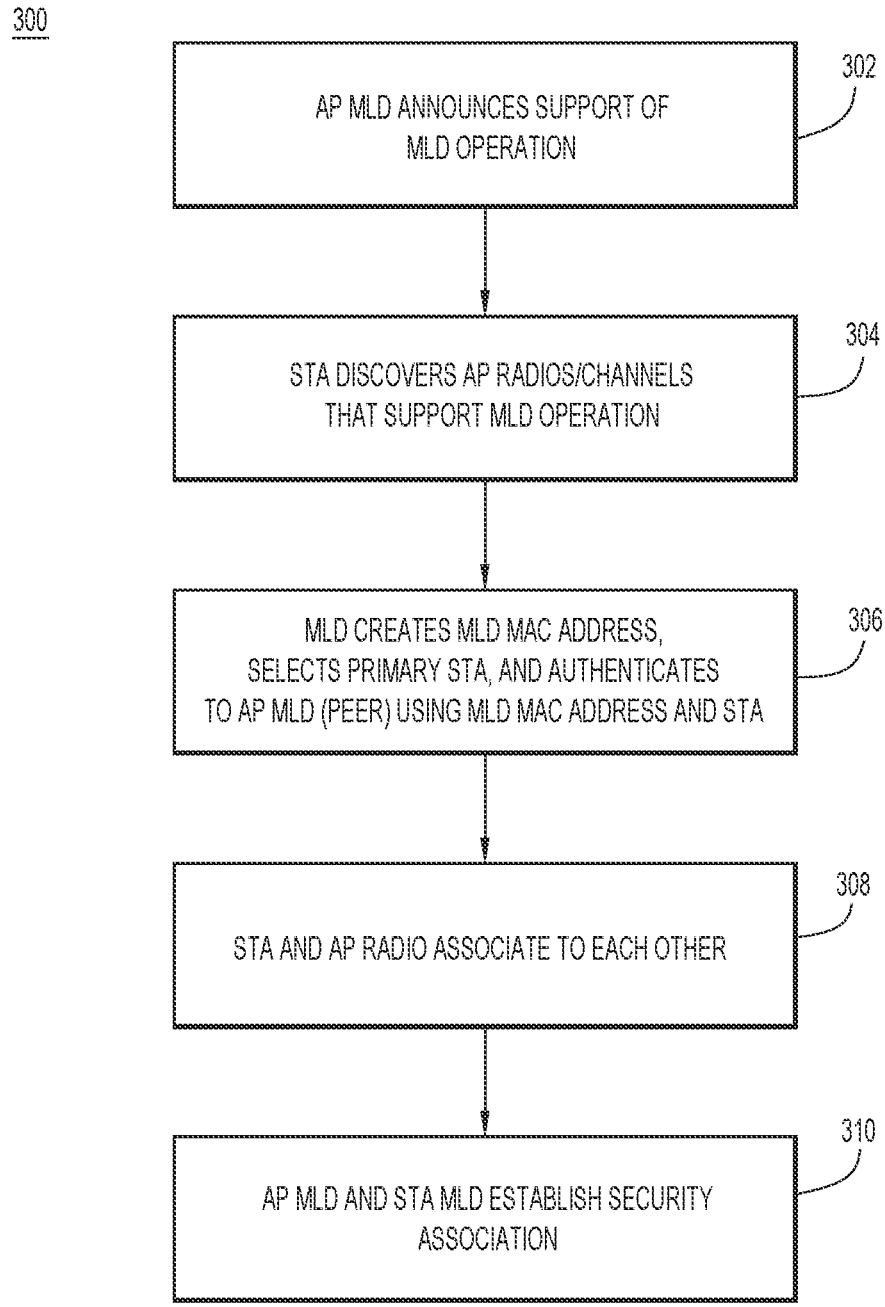
FIG. 3 is a flowchart of a method of establishing one or more links associated to an MLD (layer) of the STA MLD, according to an example embodiment.

With reference to FIG. 3, there is a flowchart of an example method 300 of establishing one or more links (e.g., link L1 or L2) associated to MLD 214. Method 300 includes operations by which MLD 214 becomes "enabled."

At 302, each AP (e.g., AP MLD 106) that supports multi-link operation (i.e., that provides "MLD support") announces such support in periodically transmitted beacons, and in probe responses. Specifically, each AP radio (e.g., a radio of AP1) announces its MLD support and the channels on which such support is provided.

At 304, each STA (e.g., STA1) of STA MLD 108 discovers the AP radios that provide the MLD support by passively scanning beacons and sending probe requests, to which the AP radios respond with probe responses. Discovered channels are passed to MLD 214 of STA MLD 108, and each STA scans the discovered channels to determine whether they are usable.

At 306, MLD 214 creates an MLD MAC address (e.g., MLD1), and selects a primary STA to associate to a corresponding AP MLD over a primary link. The primary STA sends, to the AP radio over the primary link, an 802.11 authentication request frame including a source address (SA)=STA (i.e., link) MAC address (e.g., MAC1), a destination address (DA)=AP radio MAC address, the MLD MAC address, and a first link identifier. The AP radio responds with an 802.11 authentication response (status=success). The response includes the AP radio MAC address, the STA MAC address, and an AP MLD MAC address from an AP MLD peer to MLD 214.

At 308, the STA and AP radio exchange an association request and response by which the STA and the AP radio become associated.

At 310, when security is in place, the STA generates security keys. Through the STA, the MLD 214 establishes a connection with the AP, which either results in an agreement that both sides have the same passphrase, or the STA is relayed to a remote authentication dial-in user service (RADIUS) server through which the same conclusion is made. At the end of that conclusion, the AP and the STA exchange 4 frames (using a 4-way handshake) that confirm that both sides have the same passphrase/key, and the AP passes the group key to the STA.

At this time, MLD 214 is "enabled" because it has an active connection (e.g., over the identified link) to the AP using the MLD MAC address (e.g., MLD1) and its bundled link MAC address (e.g., MAC1). The above operations may be repeated to establish a second link/connection using a second MLD MAC address (e.g. MLD2) created by the MLD.

Once the MLD is enabled, applications 122 may interact with OS 120 to establish traffic flows using the MLD, as described below in connection with FIG. 4.

Figure 4:
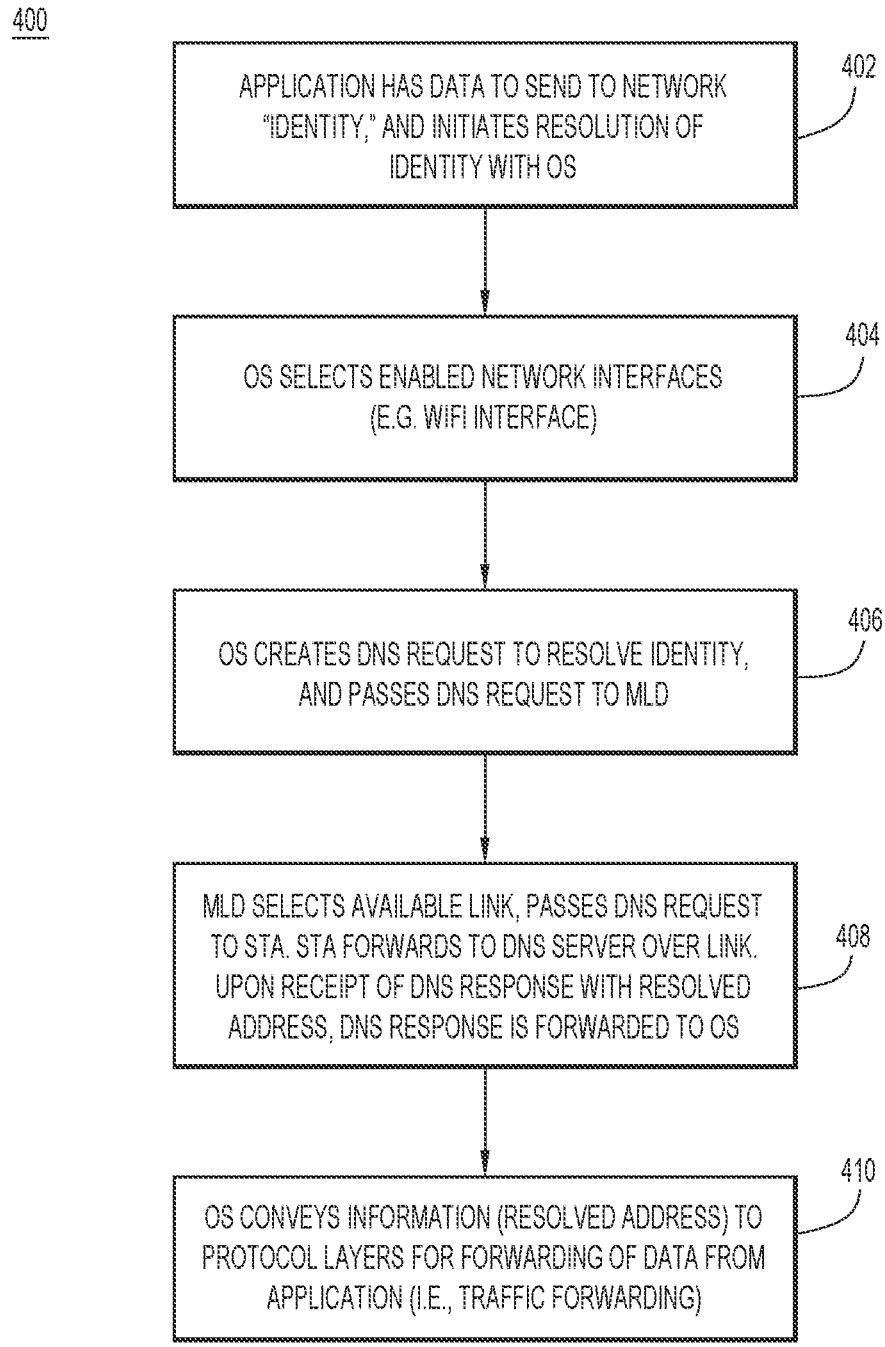
FIG. 4 is a flowchart of a method by which an application hosted on the STA MLD uses communication protocol stacks to send traffic to another instance of the application over a network, according to an example embodiment.

With reference to FIG. 4, there is a flowchart of an example method 400 by which an application among applications 122 uses a protocol stack among protocol stacks P1 and P2 to send traffic to another instance of the application over a network, e.g., when a meeting application client sends data, such as a connection request, video, or other media, to a server.

At 402, the application determines an identity of where to send the traffic. The "where" may be a higher Layer construct (e.g., "connect.webex.com"). The application passes a request to OS 120 (e.g., in the form of a socket) to connect to the identity, after which the OS returns an identifier (ID), as described below.

At 404, OS 120 examines existing enabled network interfaces, such as LTE, Wi-Fi (MLD), and so on, and selects one of them, e.g., Wi-Fi. An example of enabling network interfaces was described above in connection with FIG. 3. OS 120 examines which L3 identity/type is available for the chosen network interface (e.g., IPv4, IPv6, or both). When both are available, OS 120 typically prefers one (e.g., IPv6), and reverts to the other if the attempt to connect with the preferred one fails. This example assume OS 120 selects Wi-Fi (MLD), with IPv6, because MLD 214 is enabled, i.e., has access to at least one connected link (e.g., link L2).

At 406, OS 120 resolves the identity to an IPv6 address. The L3 identity includes parameters that indicate an IP address of a DNS server (i.e., a DNS IP address). OS 120 constructs a DNS request for the identity (e.g., connect.webex.com) in the form of an IPv6 packet to be sent to the DNS IP address, from the Wi-Fi IPv6 address of STA MLD 108, and passes the DNS request to MLD 214.

At 408, MLD 214 selects an available link (e.g., link L2), and passes the DNS request to the STA (e.g., STA2) for that link. The STA (logical function) encapsulates the DNS request (e.g., IPv6 packet) into an L2 frame, with a source link MAC address=STA/link MAC address (e.g., MAC2), and a destination link MAC address of an AP radio to which the STA is connected. The STA then manages the task of sending the DNS request as an L2 frame to the AP. On the return path, each entity has its own address (e.g., MAC address, or IP address). Therefore, upon receipt of a DNS response to the DNS request, the DNS response is forwarded along the return path to OS 120, which accesses the resolved address for the identity (e.g., for "connect.webex.com") in the DNS response.

At 410, OS 120 applies the requests from 402 (e.g., the socket) and uses the IP layer (e.g., IPv6) to send traffic through the same path established/used at 404-408.

Seamless MAC address rotation (RCM) in the MLD context using multiple IP stacks is described below in connection with FIGS. 5-7. In FIGS. 5-7, PHYs PHY1 and PHY2 are labeled as NICs "NIC1" and "NIC2."

Prior to RCM, STA MLD 108 establishes multiple IP stacks associated to distinct MLD MAC addresses as described above in connection with FIGS. 2-4. FIG. 5 is an illustration of an example initial configuration 500 of logical and/or physical entities/components established in STA MLD 108, prior to RCM. Configuration 500 is similar to configuration 200 described above in connection with FIG. 2, except for differences in the bundling of link MAC addresses under the MLD MAC addresses, as is now described. Similar to configuration 200, configuration 500 associates first MLD MAC address MLD1 to the IPv4 address of the IPv4 stack, and second MLD MAC address MLD2 (which is different from MLD1) to the IPv6 address of the IPv6 stack. Each MLD MAC address is dynamically associated to zero or more link MAC addresses. For example, both link MAC addresses MAC1 and MAC2 are associated to/bundled with first MLD MAC address MLD1, and zero link MAC addresses are associated to second MLD MAC address MLD2. Thus, prior to RCM, STA1 comprises MLD1 with MAC1 and MAC2. Thus, MLD 214 may direct IPv4 traffic through MLD1 to either MAC1/NIC1 or MAC2/NIC2, or both MAC1/NIC1 and MAC2/NIC2, concurrently. Note that, in a dual-STA case, the pre-STD MLD utilizes two IPv4 addresses from a single source MAC/identity.

In a first RCM scenario, starting with configuration 500, STA MLD 108 initiates RCM to rotate link MAC address MAC2 to a new link MAC address MAC3. To do this, STA MLD 108 (i) stops sending IPv4 traffic using MLD1, (ii) removes link MAC address MAC2 from MLD1 (i.e., debundles or disassociates MAC2 from MLD1) and removes MAC2 from NIC2, (iii) creates new link MAC address MAC3, and (iv) assigns MAC3 to MLD2 (i.e., bundles MAC3 under MLD2) and configures MAC3 on NIC2. FIG. 6 is an illustration of an example configuration 600 of logical and/or physical entities/components established in STA MLD 108 by the RCM. After RCM, STA1 comprises MLD1 with MAC1, and STA2 comprises MLD2 with MAC3. In this configuration, MLD 214 directs IPv4 traffic through MLD1 to MAC1/NIC1 and directs IPv6 traffic through MLD2 to MAC3/NIC2, concurrently, or one protocol stack at a time. Throughout the RCM, the IPv4 and IPv6 stacks maintain their IPv4 and IPv6 addresses because the IP stacks were/are associated to distinctive MLD MAC addresses MLD1 and MLD2. Note that, in the dual-STA case, the pre-STD MLD configuration would appear identical to configuration 600 (i.e., with one IP interface per NIC/link).

In a second (alternative) RCM scenario, starting with configuration 500, MAC2 remains assigned to MLD1 and configured on NIC2, while STA MLD 108 generates new link MAC address MAC3 also for NIC2. STA MLD 108 assigns MAC3 to MLD2 and configures MAC3 on NIC2. Thus, STA1 comprises MLD1 with MAC1 and MAC2, and STA2 comprises MLD2 with MAC3 (see, e.g., FIG. 7). During/throughout the alternative RCM, STA MLD 108 may continue to exchange IPv4 traffic over link L1 using MLD1 and MAC1 or MAC2. FIG. 7 is an illustration of an example configuration 700 of logical and/or physical entities/components established in STA MLD 108 by the alternative RCM scenario. In configuration 700, after RCM, MLD1 and MLD2 share physical interface NIC2. Note that, in the dual-STA case, the pre-STD MLD configuration appears identical to configuration 700.

Figure 8:
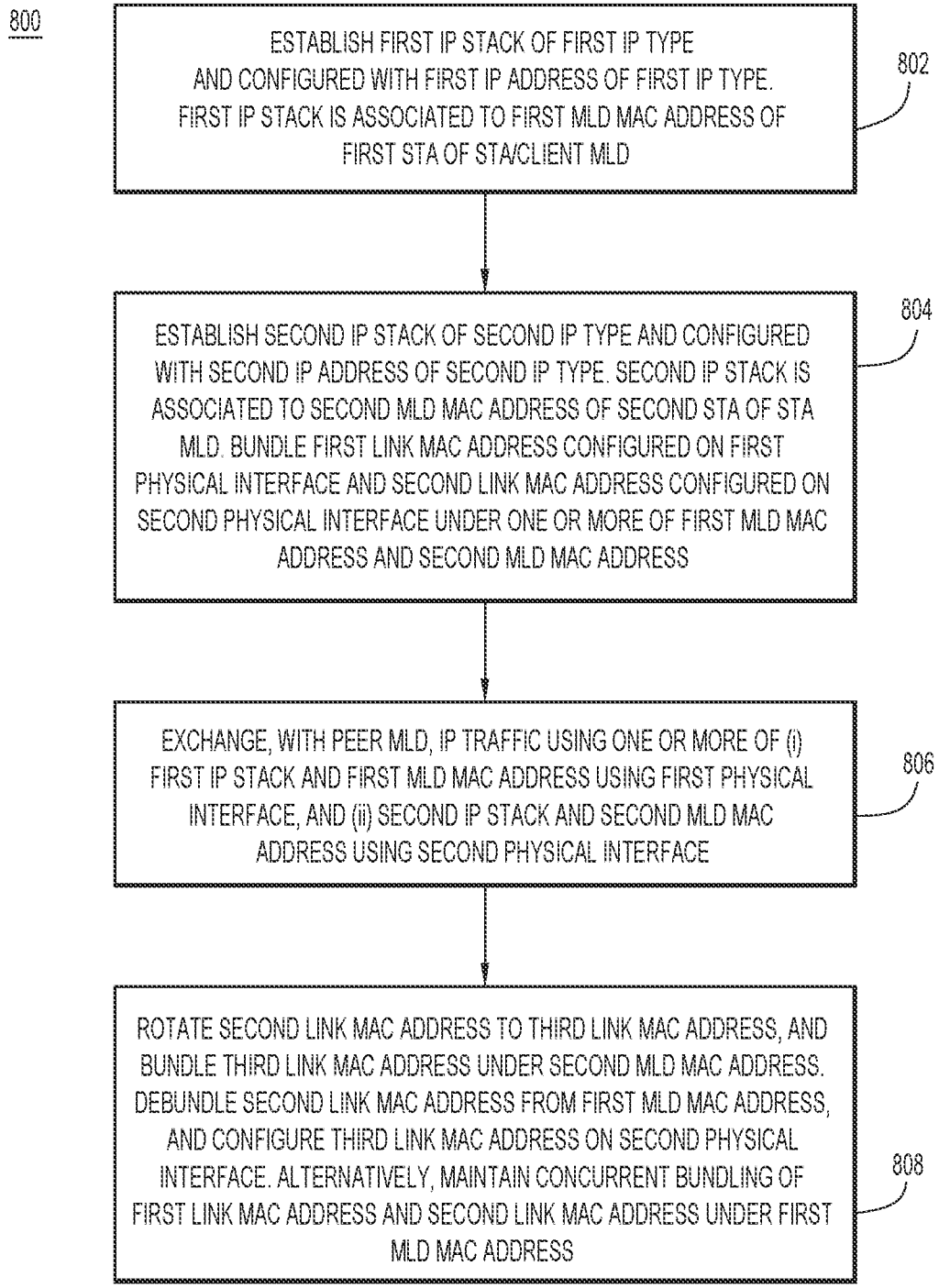
FIG. 8 is a flowchart of a method of performing seamless MAC address rotation in an MLD context by leveraging multiple IP stacks in the STA MLD, according to an example embodiment.

With reference to FIG. 8, there is a flowchart of an example method 800 of performing seamless MAC address rotation in an MLD context by leveraging multiple IP stacks (of different types) in a STA MLD (e.g., STA MLD 108) configured for MLO. Method 800 includes various operations described above in connection with FIGS. 2-7.

At 802, the STA MLD establishes a first IP stack of a first IP type (e.g., IPv4) and configured with a first IP address of the first IP type. The IP stack is associated to a first MLD MAC address (e.g. MLD1) of a first STA (e.g., STA1) of the STA MLD.

At 804, the STA MLD establishes a second IP stack of a second IP type (e.g., IPv6) and configured with a second IP address of the second IP type. The second IP stack exists concurrently with the first IP stack and is associated to a second MLD MAC address (e.g., MLD2) of a second STA (e.g., STA2) of the STA MLD. The MLD MAC addresses exist concurrently with each other and with the first and second IP stacks.

The STA MLD bundles a first link MAC address (e.g., MAC1) configured on a first physical interface (e.g., PHY1) and a second link MAC address (e.g., MAC2) configured on a second physical interface (e.g., PHY2) under one or more of the first MLD MAC address and the second MLD MAC address. For example, the STA MLD may bundle both the first link MAC address and the second link MAC address under the first MLD MAC address. Alternatively, the STA MLD may bundle the first link MAC address and the second link MAC address under the first MLD MAC address and the second MLD MAC address, respectively.

At 806, the STA MLD exchanges, with a peer MLD (e.g., an AP MLD), IP traffic using one or more of (i) the first IP stack and the first MLD MAC address, and (ii) the second IP stack and the second MLD MAC address. For example, the STA MLD may exchange, with the peer MLD, the IP traffic over the first physical interface and the second physical interface.

At 808, the STA MLD rotates the second link MAC address to a third link MAC address (e.g., MAC3), and bundles the third link MAC address under the second MLD MAC address (i.e., assigns/associates the third link MAC address to the second MLD MAC address). In an example, rotating further includes debundling (i.e., removing or disassociating) the second link MAC address from the first MLD MAC address and configuring the third link MAC address on the second physical interface. In another example, rotating includes maintaining a concurrent bundling of the first link MAC address and the second link MAC address under the first MLD MAC address, and configuring the third link MAC address on the second physical interface.

In another example, method 800 includes, prior to rotating/RCM, selecting between the first IP stack and the second IP stack in support of sending traffic to the selected IP stack during RCM (i.e., rotating the second link MAC address to the third link MAC address).

Various other link and MLD MAC address rotation combinations are possible as would be appreciated by one having ordinary skill in the relevant arts having access to the present description.

A contextual utilization of the configurations/models presented above is that MLD1 and MLD2 use different IP protocols (e.g., one uses IPv4 and the other uses IPv6). OS 120, creating socket calls, manages traffic flows for the different IP protocols to determine which flow can be supported by which IP protocol(s). The STA MLD can forewarn the AP MLD about the fact that MLD1 and MLD2 belong to the same client entity either explicitly or implicitly (e.g., using a common source MAC/identity). Alternatively, the model allows for privacy increase beyond the AP MLD, as the wireless infrastructure "sees" two or more MAC addresses and two different IP addresses. Without explicit indication from the STA MLD that both IPs belong to the same STA, the wireless infrastructure cannot know that a single STA is "hiding" behind both addresses. This method thus allows for multiple applications to exchange traffic concurrently. An application, such as FaceTime, can split communications between both IP stacks, thus making the task of capturing traffic flows for voice and video more difficult to observe. Similarly, a STA can establish one IPv4, and one IPv6, session to a server, and split traffic between both types of IP protocol (e.g., fragments of data sent on each), making the task of an observer attempting to perform traffic patterning more difficult.

Embodiments for Augmentation of Multi-Link Proxy to Support MLDs to Allow IP-Specific (e.g., Either IPv4 or IPv6) Transparent RCM Rotation (the "Proxy Embodiments")

The proxy embodiments are now described in connection with FIGS. 2 and 9-15. In the previously described multi-stack embodiments, a STA MLD concurrently employs different types of IP stacks respectively associated to distinct MLD MAC addresses in order to rotate MAC addresses across the different IP protocols. In some scenarios, however, it is desirable to rotate MAC addresses within a single type of IP protocol (e.g., within IPv4 or IPv6). In other scenarios, a STA MLD supports a form of multi-link technology that sits at the transport layer (i.e., at Layer 4 (L4)), e.g., with the transmission control protocol (TCP) or the user datagram protocol (UDP). Alternatively, the multi-link technology may sit between the L3 and L4 layers, when using a proxy mode.

In the proxy mode, the STA MLD employs a multi-link proxy layer to load balance traffic between what is perceived as different underlying physical interfaces (e.g., for Wi-Fi and for LTE). Since the physical interfaces are expected to reside on different mediums, the multi-link proxy layer allows for different IP addresses, and load balances concurrent traffic flows across the IP addresses, from the transport layer on down. Different types of multi-link proxies include, but are not limited to, the multipath transmission control protocol (TCP) (MPTCP), QUIC, and hybrid information-centric networking (ICN) (hICN), for example. While such multi-link proxies can load balance across different links, they are not intended to manage a STA identity over a single link/medium.

As described above, the MLD relies on a virtual address (i.e., an MLD MAC address) that sits above multiple link interfaces. Because both the MLD and the multi-link proxy layer sit above the link interfaces, there is an opportunity to augment the multi-link proxy layer with the MLD concept, and thereby combine their respective capabilities. To this end, the proxy embodiments presented below augment the multi-link proxy layer with the MLD in the MLD STA to enable IP-specific (e.g., either IPv4 or IPv6) transparent RCM rotation.

At a high-level, in the proxy embodiments, the multi-link proxy layer (e.g., MPTCP, QUIC, or hICN) sits above the IP layer, and MLDs are treated as virtual interfaces by the IP layer, i.e., the MLDs present respective virtual interfaces to the IP layer. In other words, instead of directly connecting the multi-link proxy layer to physical interfaces, the proxy embodiments surface one or more MLD(s) as virtual interfaces to the multi-link proxy layer. The multi-link proxy layer generates one IP address per MLD (e.g., one IPv4 or IPv6 address per MLD, thus 2 IPv4 or 2 IPv6 addresses when 2 MLDs are created; alternatively, the multi-link proxy layer generates one of each IP address (one IPv4, one IPv6) per MLD). Then, link MAC address allocation is performed on a per MLD basis, where the link MAC addresses sit above one or more physical interfaces. The multi-link proxy layer may chose an interface (which is in fact one MLD in the Wi-Fi stack), for example. For RCM, the multi-link proxy layer creates a new IP per MLD for each RCM (rotation), and one or more of the physical interfaces are assigned a new link MAC address and are associated to the MLD. The MLD (in STA MLD 108) associates to its corresponding layer in an AP MLD (appearing as a new STA), completes IP address assignment, and takes over the traffic of the STA (i.e., new traffic flows start from the new MLD).

Figure 9:
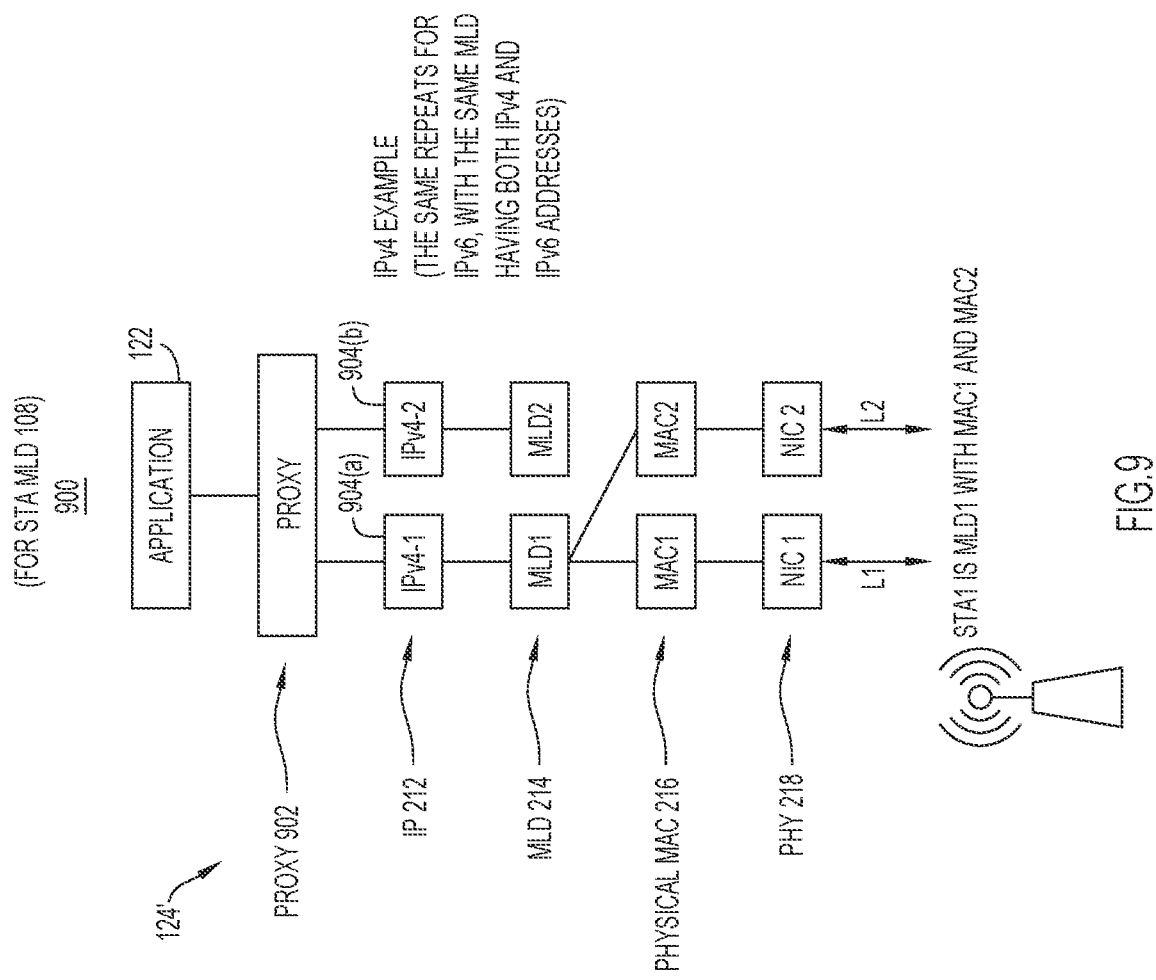
FIG. 9 shows components of the STA MLD including a multi-link proxy layer augmented with MLDs for RCM, according to an example embodiment.

Referring to FIG. 9, there is an illustration of an example configuration 900 of logical and/or physical components of STA MLD 108 in a proxy embodiment. Configuration 900 includes many of the same features as configurations 200 and 500-700 described above, but differs in several respects, as described below. Configuration 900 includes protocol layers 124' that expand on protocol layers 124. Specifically, protocol layers 124' additionally include a multi-link proxy layer (referred to simply as a "proxy") 902 positioned between, and linked to, applications 122 and IP layer 212. IP layer 212 is configured with (i) a first IP stack 904(*a*) of a first type (e.g., IPv4) and configured with a first IP address (e.g., IPv4-1) of the first type, and (ii) a second IP stack 904(*b*) of the same type as the first IP stack and configured with a second IP address (e.g., IPv4-2). In an alternative example, the first IP stack may be an IPv6 stack configured with a first IPv6 address IPv6-1, and the second IP stack may also be an IPv6 stack configured with a second IPv6 address IPv6-2

MLD 214 is configured with first MLD MAC address MLD1 and second MLD MAC address MLD2 respectively associated to or linked with first IP stack 904(*a*) and second IP stack 904(*b*). First MLD MAC address MLD1 is bundled with (i) link MAC address MAC1 configured on NIC1, and (ii) link MAC address MAC2 configured on NIC2. Second MLD MAC address MLD2 is not bundled with any link MAC addresses. In this configuration, STA1 comprises MLD1 with MAC1 and MAC2. Proxy 902 directs IPv4-1 traffic flow from applications 122 to MLD1.

At any point in time, proxy 902 may activate/enable a new or second interface associated to IPv4-2 and MLD2. As MLD2 presents the second interface through an IP address to proxy 902, the proxy may perform a subnet detection to check whether the second interface (e.g., IPv4-2) is within the same subnet as the previous address (e.g., IPv4-1). This can take the form of a dynamic host configuration protocol (DHCP) request, for example, and an examination of the DHCP offer tells the proxy 902 whether the subnets are the same, in which case the proxy may bundle two MLDs under the same IP address, or directly assigns a second IPv4 address to the other interface (i.e., to remove dependency between both interfaces, which is a more common arrangement).

Figure 10:
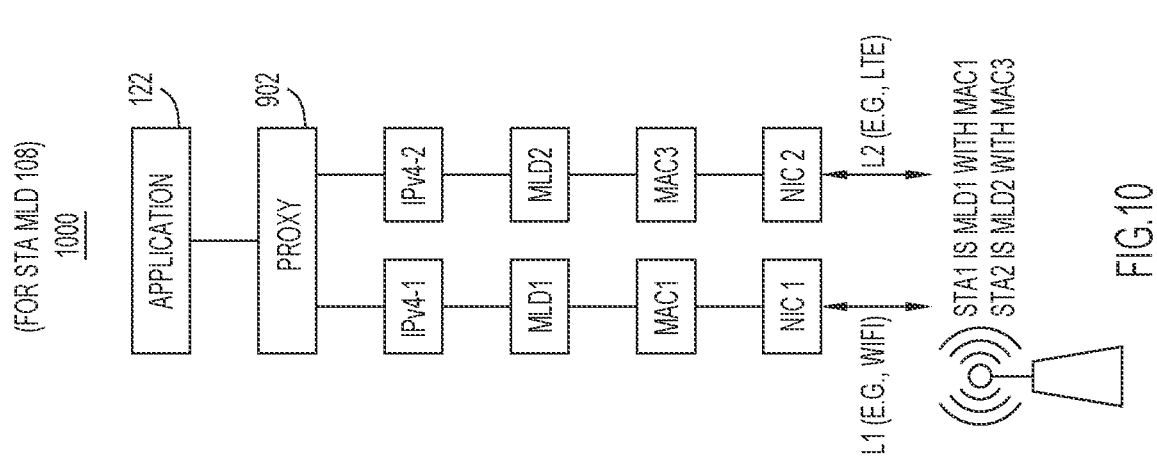
FIG. 10 shows the components of the STA MLD including the multi-link proxy layer after rotation of a link MAC address, according to an example embodiment.

Successive RCM operations are now described in connection with FIG. 9-12. Starting with configuration 900, STA MLD 108 may perform RCM to rotate MAC2 from MLD1/NIC1 to a new link MAC address MAC3 on MLD2/NIC2. To do this, proxy 902 first stops IPv4-1 traffic flow through MLD1. Then, STA MLD 108 rotates MAC2 to MAC3 by removing or debundling MAC2 from MLD1, removing MAC2 from NIC2, creating MAC3, bundling MAC3 under MLD2, and configuring MAC3 on NIC2. FIG. 10 is an illustration of an example configuration 1000 of logical and/or physical entities/components established in STA MLD 108 due to the above-described rotation of MAC2 to MAC3. In FIG. 10 (and the remaining figures) IP stacks 904(*a*), 904(*b*) are denoted using their respective IP addresses "IPv4-1," "IPv4-2," respectively. In configuration 1000, STA1 comprises MLD1 with MAC1, and STA2 comprises MLD2 with MAC3. Proxy 902 may direct IPv4-1 and IPv4-2 traffic respectively through MLD1 and MLD2, concurrently, or by selecting and using one IP stack (and its associated MLD MAC address) at a time.

Figure 12:
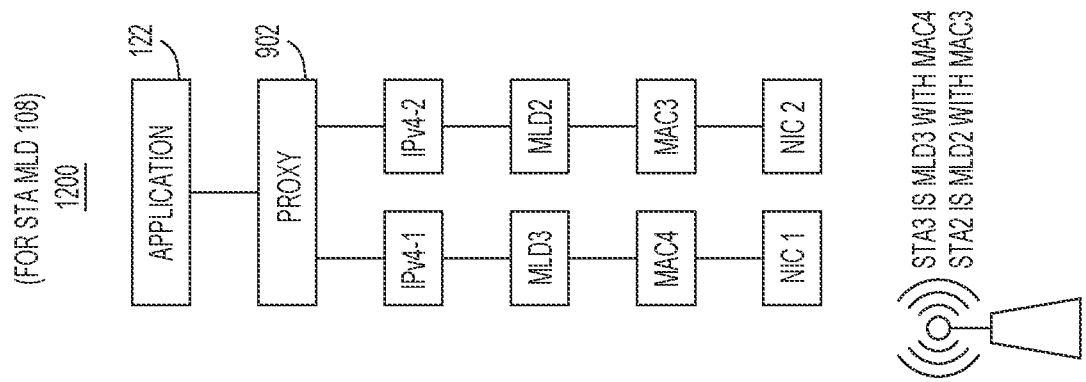
FIG. 12 shows a configuration of the components in the STA MLD, including the multi-link proxy layer, which results from rotation of an MLD MAC address and a link MAC address, according to an example embodiment.
Figure 11:
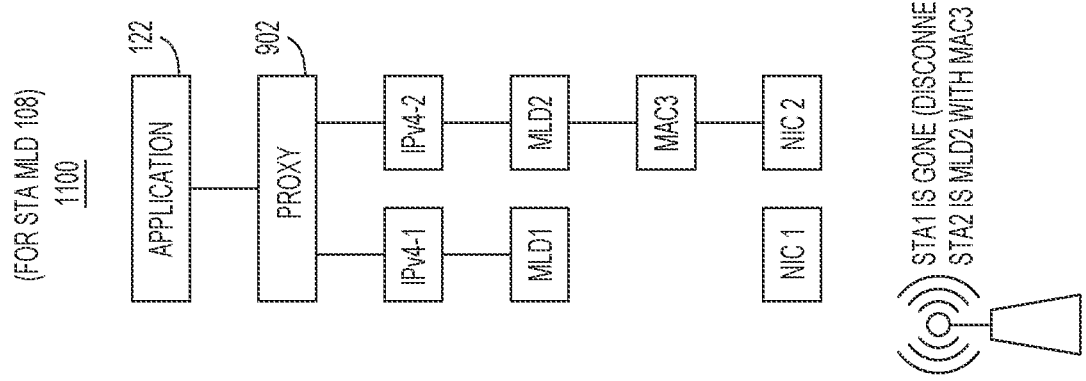
FIG. 11 shows a configuration of the components of the STA MLD including the multi-link proxy layer mid-RCM, according to an example embodiment.

Starting with configuration 1000 (FIG. 10), STA MLD 108 next performs RCM to rotate MAC1 to a new link MAC address MAC4, and to rotate MLD1 to a new MLD MAC address MLD3. First, proxy 902 stops sending IPv4-1 traffic through MLD1, and removes MAC1 from MLD1 and NIC1. FIG. 11 shows an example configuration 1100 of STA MLD 108, which results from the removal of MAC1. In configuration 1100, STA1 is disconnected (i.e., no longer exists), and STA2 comprises MLD2 with MAC3. Thus, proxy 902 directs IPv4-2 traffic only through MLD2 (STA2). Starting with configuration 1100 (FIG. 11), to rotate MLD1, STA MLD 108 removes/disassociates MLD1 from IPv4-1, creates MLD3, and associates MLD3 to IPv4-1 in place of MLD1 (i.e., MLD3 replaces MLD1). Next, to rotate MAC1 to MAC4, STA MLD 108 creates MAC4, bundles MAC4 under MLD3, and configures MAC4 on NIC1. FIG. 12 shows an example configuration 1200 of STA MLD 108, which results from the rotation of MLD1 to MLD3, and the rotation from MAC1 to MAC4. In configuration 1200, STA1 comprises MLD3 with MAC4, and STA2 comprises MLD2 with MAC3. Proxy 902 may now transmit IPv4-1 traffic using MLD3, and transmit IPv4-2 traffic using MLD2. During the aforementioned rotation of MAC1 and MLD1, STA MLD 108 may continue to send traffic using IPv4-2 and MLD2 without generating a new IP address.

Figures 13, 14, 15:
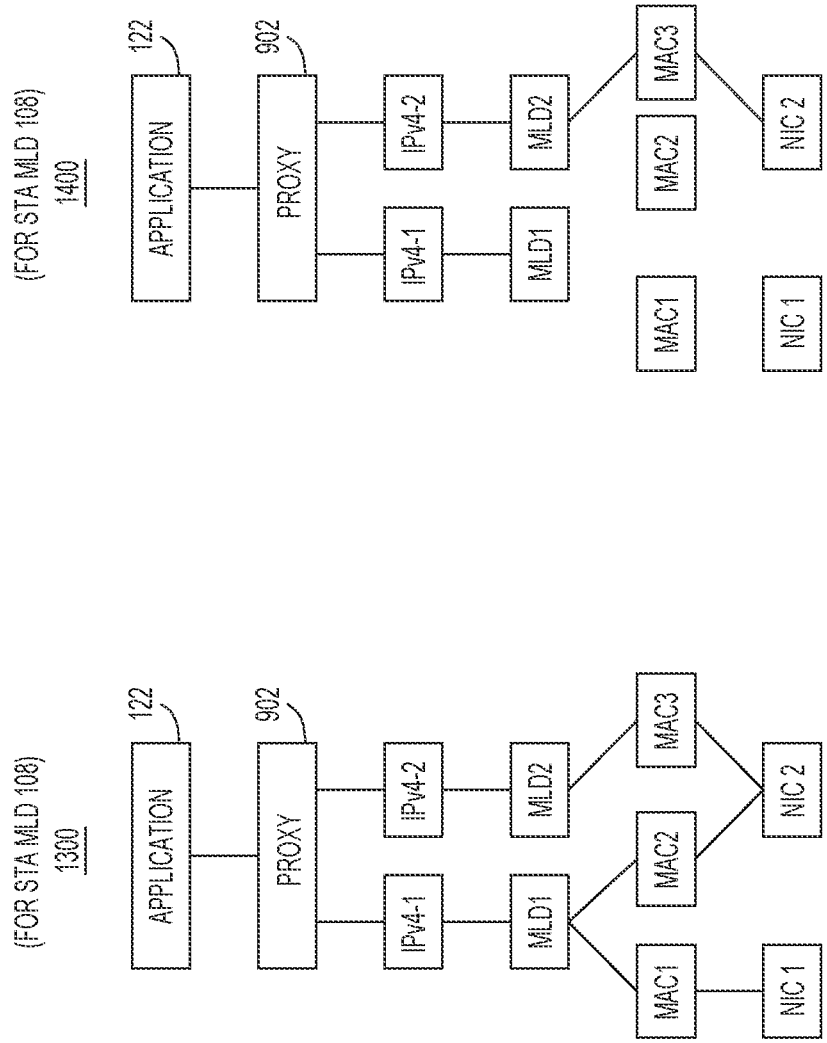
FIG. 13 shows a configuration of the components of the STA MLD including the multi-link proxy layer after adding a new link MAC address to existing link MAC addresses, according to an example embodiment.
FIG. 14 shows a configuration of the components of the STA MLD including the multi-link proxy layer mid-RCM, according to an example embodiment.
FIG. 15 shows a configuration of the components of the STA MLD including the multi-link proxy layer when the RCM of FIG. 14 is completed, according to an example embodiment.

Additional successive RCM operations are now described in connection with FIGS. 9 and 13-15. Starting with configuration 900 (FIG. 9), STA MLD 108 creates a new link MAC address MAC3, bundles MAC3 under MLD2, and configures MAC3 on NIC2. FIG. 13 shows an example configuration 1300 that results from adding MAC3 in this way. STA1 comprises MLD1 with MAC1 and MAC2, and STA2 comprises MLD2 with MAC3. Thus, MLD1 and MLD2 share NIC2 and thus link L2.

Starting with configuration 1300 (FIG. 13), with the intention to rotate all three of MLD1, MAC1 (or MAC2), and IPv4-1, STA MLD 108 removes MAC1 and MAC2 from MLD1, removes MAC1 from NIC1, and removes MAC2 from NIC2. FIG. 14 shows an example configuration 1400, which results from these operations. STA1 is gone, and STA2 comprises MLD2 with only MAC3. STA MLD 108 may still send IPv4-2 traffic using MLD2.

Starting with configuration 1400 (FIG. 14), STA MLD 108 creates a new MLD MAC address MLD3 (rotated from MLD1), a new link MAC address MAC4 (rotated from MAC1), and a new IPv4 address IPv4-3 (rotated from IPv4-1). STA MLD 108 replaces IPv4-1 with IPv4-3, associates MLD3 to IPv4-3, bundles MAC4 under MLD3, and configures MAC4 on NIC1. FIG. 15 shows an example configuration 1500, which results from these operations. In configuration 1500, newly created STA3 comprises MLD3 with MAC4, and STA2 comprises MLD2 with MAC3. Proxy 902 can send IPv4-3 traffic using MLD3, and send IPv4-2 traffic using MLD2.

In summary, when various RCM operations occur as described above in connection with FIGS. 9-15, stability can be achieved by having one link MAC address removed (i.e., debundled or disassociated) from first MLD MAC address MLD1 (and, as MLD1 is still visible to the proxy, the connection appears unchanged from the proxy standpoint) and then assigned to/bundled under second MLD MAC address MLD2. As MLD2 is now associated to more physical interfaces than are available to MLD1, the configuration appears more efficient to proxy 902 because more traffic can flow through MLD2 than through MLD1. Accordingly, proxy 902 may increase the traffic load on MLD2 and decrease the traffic load on MLD1. At some point, the traffic load on MLD1 can be reduced to zero. In another embodiment, once the flow through MLD1 is reduced, the last physical interface remaining on MLD1 may be removed. At this point MLD1 has no associated physical interface, and thus its traffic load drops to zero. However, from the point of view of proxy 902, MLD1 is still enabled, i.e., up and running, in which case the proxy may interpret the MLD1 interface as valid but having poor performance. In that case, proxy 902 may direct all traffic through MLD2.

Figure 16:
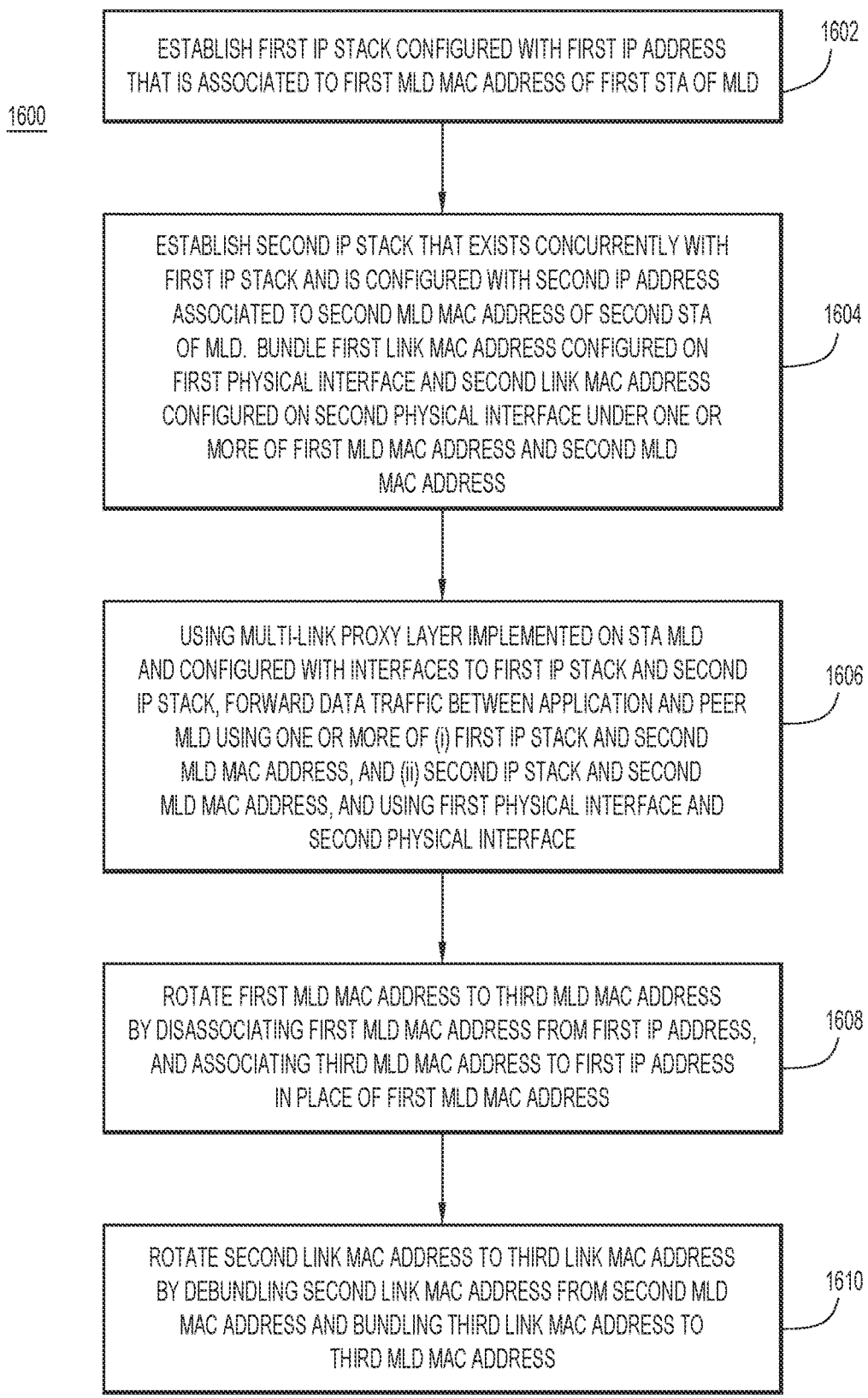
FIG. 16 is a flowchart of a method of performing RCM in the STA MLD including the multi-link proxy layer, according to an example embodiment.

With reference to FIG. 16, there is a flowchart of an example method 1600 of performing RCM in a STA MLD (e.g., 108) configured for MLO and that includes a multi-link proxy layer (e.g., 902) augmented with MLD capabilities. Method 800 includes various operations described above in connection with FIGS. 9-15, for example.

At 1602, the STA MLD establishes a first IP stack of a first IP type (e.g., IPv4 or IPv6) configured with a first IP address that is associated to a first MLD MAC address (e.g., MLD1) of a first station (e.g., STA1) of the STA MLD.

At 1604, the STA MLD establishes a second IP stack of a second IP type that is the same as the first IP type. The second IP stack is configured with a second IP address that is associated to a second MLD MAC address (e.g., MLD2) of a second station (e.g., STA2) of the STA MLD. The IP stacks are of the same IP type and exist concurrently, and the MLD MAC addresses exist concurrently with the IP stacks. Thus, the first IP stack, the second IP stack, the first IP address, and the second IP address each conform to (i.e., are based on) the same IP type (i.e., the same type of IP), including one of IPv4 and IPv6.

The STA MLD bundles a first link MAC address (e.g., MAC1) configured on a first physical interface (e.g., PHY1) and a second link MAC address (e.g., MAC2) configured on a second physical interface (e.g., PHY2) under one or more of the first MLD MAC address and the second MLD MAC address. For example, the STA MLD may bundle the first link MAC address and the second link MAC address under the first MLD MAC address and the second MLD MAC address, respectively.

At 1606, the STA MLD establishes/implements a multi-link proxy layer having respective interfaces to the first IP stack and the second IP stack. The multi-link proxy layer exchanges data traffic with an application implemented on or accessible to the STA MLD. The multi-link proxy layer forwards the data traffic between the application and a peer MLD using one or more of (i) the first IP stack and the second MLD MAC address, and (ii) the second IP stack and the second MLD MAC address. For example, the multi-link proxy layer may exchange, with the peer MLD, the data traffic over the first physical interface and the second physical interface. The multi-link proxy layer may load balance the data traffic across the MLD MAC addresses, and may exchange the data traffic using the first IP stack and the second IP stack concurrently.

At 1608, the STA MLD rotates the first MLD MAC address to a third MLD MAC address (e.g., MLD3) by disassociating the first MLD MAC address from the first IP address, and associating the third MLD MAC address to the first IP address in place of the first MLD MAC address.

At 1610, the STA MLD may also rotate the second link MAC address to a third link MAC address (MAC3) by debundling the second link MAC address from the second MLD MAC address and bundling the third link MAC address to the third MLD MAC address.

Various other link and MLD MAC address rotation combinations are possible as would be appreciated by one having ordinary skill in the relevant arts having access to the present description.

Computing Device

Figure 17:
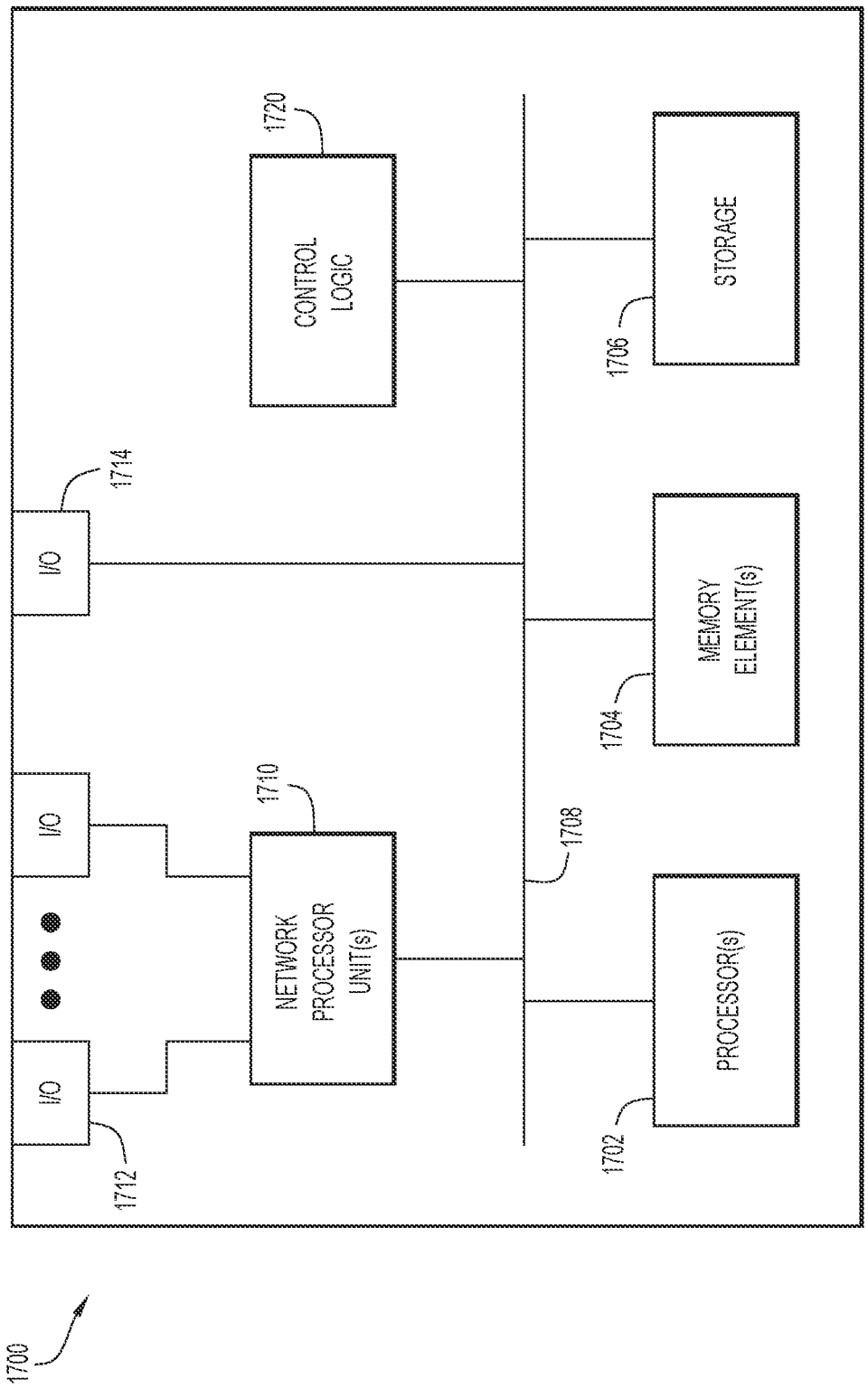
FIG. 17 is a hardware block diagram of a device that may perform functions associated with operations discussed herein, according to an example embodiment.

Referring to FIG. 17, FIG. 17 illustrates a hardware block diagram of a computing device 1700 that may perform functions associated with operations discussed herein in connection with the techniques depicted in FIGS. 1-16 In various embodiments, a computing device or apparatus, such as computing device 1700 or any combination of computing devices 1700, may be configured as any entity/entities as discussed for the techniques depicted in connection with FIGS. 1-16 in order to perform operations of the various techniques discussed herein. For example, computing device 1700 may represent an EHT device, such as AP MLD 106 and components thereof, and/or STA MLD 108 and components thereof.

In at least one embodiment, the computing device 1700 may be any apparatus that may include one or more processor(s) 1702, one or more memory element(s) 1704, storage 1706, a bus 1708, one or more network processor unit(s) 1710 interconnected with one or more network input/output (I/O) interface(s) 1712, one or more I/O interface(s) 1714, and control logic 1720. In various embodiments, instructions associated with logic for computing device 1700 can overlap in any manner and are not limited to the specific allocation of instructions and/or operations described herein.

In at least one embodiment, processor(s) 1702 is/are at least one hardware processor configured to execute various tasks, operations and/or functions for computing device 1700 as described herein according to software and/or instructions configured for computing device 1700. Processor(s) 1702 (e.g., a hardware processor) can execute any type of instructions associated with data to achieve the operations detailed herein. In one example, processor(s) 1702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1704 and/or storage 1706 is/are configured to store data, information, software, and/or instructions associated with computing device 1700, and/or logic configured for memory element(s) 1704 and/or storage 1706. For example, any logic described herein (e.g., control logic 1720) can, in various embodiments, be stored for computing device 1700 using any combination of memory element(s) 1704 and/or storage 1706. Note that in some embodiments, storage 1706 can be consolidated with memory element(s) 1704 (or vice versa), or can overlap/exist in any other suitable manner.

In at least one embodiment, bus 1708 can be configured as an interface that enables one or more elements of computing device 1700 to communicate in order to exchange information and/or data. Bus 1708 can be implemented with any architecture designed for passing control, data and/or information between processors, memory elements/storage, peripheral devices, and/or any other hardware and/or software components that may be configured for computing device 1700. In at least one embodiment, bus 1708 may be implemented as a fast kernel-hosted interconnect, potentially using shared memory between processes (e.g., logic), which can enable efficient communication paths between the processes.

In various embodiments, network processor unit(s) 1710 may enable communication between computing device 1700 and other systems, entities, etc., via network I/O interface(s) 1712 (wired and/or wireless) to facilitate operations discussed for various embodiments described herein. In various embodiments, network processor unit(s) 1710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1700 and other systems, entities, etc. to facilitate operations for various embodiments described herein. In various embodiments, network I/O interface(s) 1712 can be configured as one or more Ethernet port(s), Fibre Channel ports, any other I/O port(s), and/or antenna(s)/antenna array(s) now known or hereafter developed. Thus, the network processor unit(s) 1710 and/or network I/O interface(s) 1712 may include suitable interfaces for receiving, transmitting, and/or otherwise communicating data and/or information in a network environment, such as for communicating wirelessly.

I/O interface(s) 1714 allow for input and output of data and/or information with other entities that may be connected to computing device 1700. For example, I/O interface(s) 1714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1720 can include instructions that, when executed, cause processor(s) 1702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1704 and/or storage 1706 can store data, software, code, instructions (e.g., processor instructions), logic, parameters, combinations thereof, and/or the like used for operations described herein. This includes memory element(s) 1704 and/or storage 1706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, in some aspects, the techniques described herein relate to a method including: at a multi-link device (MLD) configured for multi-link operation: establishing a first Internet Protocol (IP) stack of a first IP type and configured with a first IP address of the first IP type, wherein the first IP stack is associated to a first MLD media access control (MAC) address of a first station of the MLD; establishing a second IP stack of a second IP type and configured with a second IP address of the second IP type, wherein the second IP stack exists concurrently with the first IP stack and is associated to a second MLD MAC address of a second station of the MLD; and exchanging, with a peer MLD, IP traffic using one or more of (i) the first IP stack and the first MLD MAC address, and (ii) the second IP stack and the second MLD MAC address.

In some aspects, the techniques described herein relate to a method, further including: bundling a first link MAC address configured on a first physical interface and a second link MAC address configured on a second physical interface under one or more of the first MLD MAC address and the second MLD MAC address, wherein exchanging includes exchanging, with the peer MLD, the IP traffic using the first physical interface and the second physical interface.

In some aspects, the techniques described herein relate to a method, wherein: bundling includes bundling the first link MAC address and the second link MAC address under the first MLD MAC address.

In some aspects, the techniques described herein relate to a method, further including: rotating the second link MAC address to a third link MAC address; and bundling the third link MAC address under the second MLD MAC address.

In some aspects, the techniques described herein relate to a method, wherein: rotating includes debundling the second link MAC address from the first MLD MAC address and configuring the third link MAC address on the second physical interface.

In some aspects, the techniques described herein relate to a method, wherein: rotating includes maintaining a concurrent bundling of the first link MAC address and the second link MAC address under the first MLD MAC address.

In some aspects, the techniques described herein relate to a method, wherein: bundling includes bundling the first link MAC address and the second link MAC address under the first MLD MAC address and the second MLD MAC address, respectively.

In some aspects, the techniques described herein relate to a method, further including: prior to rotating, selecting between the first IP stack and the second IP stack to support exchanging traffic while rotating.

In some aspects, the techniques described herein relate to a method, wherein the MLD is a non-access point (AP) MLD.

In some aspects, the techniques described herein relate to a method, wherein the first IP type is IP version (v) 4 (IPv4) and the second IP type is IPv6.

In some aspects, the techniques described herein relate to an apparatus including: one or more network input/output interfaces to communicate wirelessly; and a processor of a multi-link device (MLD) configured for multi-link operation, the processor coupled to the one or more network input/output interfaces and configured to perform: establishing a first Internet Protocol (IP) stack of a first IP type and configured with a first IP address of the first IP type, wherein the first IP stack is associated to a first MLD media access control (MAC) address of a first station of the MLD; establishing a second IP stack of a second IP type and configured with a second IP address of the second IP type, wherein the second IP stack exists concurrently with the first IP stack and is associated to a second MLD MAC address of a second station of the MLD; and exchanging, with a peer MLD, IP traffic using one or more of (i) the first IP stack and the first MLD MAC address, and (ii) the second IP stack and the second MLD MAC address.

In some aspects, the techniques described herein relate to an apparatus, wherein the processor is further configured to perform: bundling a first link MAC address configured on a first physical interface and a second link MAC address configured on a second physical interface under one or more of the first MLD MAC address and the second MLD MAC address, wherein the processor is configured to perform exchanging by exchanging, with the peer MLD, the IP traffic using the first physical interface and the second physical interface.

In some aspects, the techniques described herein relate to an apparatus, wherein: the processor is configured to perform bundling by bundling the first link MAC address and the second link MAC address under the first MLD MAC address.

In some aspects, the techniques described herein relate to an apparatus, wherein the processor is further configured to perform: rotating the second link MAC address to a third link MAC address; and bundling the third link MAC address under the second MLD MAC address.

In some aspects, the techniques described herein relate to an apparatus, wherein: the processor is configured to perform rotating by debundling the second link MAC address from the first MLD MAC address and configuring the third link MAC address on the second physical interface.

In some aspects, the techniques described herein relate to an apparatus, wherein: the processor is configured to perform rotating by maintaining a concurrent bundling of the first link MAC address and the second link MAC address under the first MLD MAC address.

In some aspects, the techniques described herein relate to an apparatus, wherein: the processor is configured to perform bundling by bundling the first link MAC address and the second link MAC address under the first MLD MAC address and the second MLD MAC address, respectively.

In some aspects, the techniques described herein relate to a non-transitory computer readable medium encoded with instructions that, when executed by a processor of a multi-link device (MLD) configured for multi-link operation, cause the processor to perform: establishing a first Internet Protocol (IP) stack of a first IP type and configured with a first IP address of the first IP type, wherein the first IP stack is associated to a first MLD media access control (MAC) address of a first station of the MLD; establishing a second IP stack of a second IP type and configured with a second IP address of the second IP type, wherein the second IP stack exists concurrently with the first IP stack and is associated to a second MLD MAC address of a second station of the MLD; and exchanging, with a peer MLD, IP traffic using one or more of (i) the first IP stack and the first MLD MAC address, and (ii) the second IP stack and the second MLD MAC address.

In some aspects, the techniques described herein relate to a non-transitory computer readable medium, further including instructions to cause the processor to perform: bundling a first link MAC address configured on a first physical interface and a second link MAC address configured on a second physical interface under one or more of the first MLD MAC address and the second MLD MAC address, wherein the instructions to cause the processor to perform exchanging include instructions to cause the processor to perform exchanging, with the peer MLD, the IP traffic using the first physical interface and the second physical interface.

In some aspects, the techniques described herein relate to a non-transitory computer readable medium, wherein: the instructions to cause the processor to perform bundling include instructions to cause the processor to perform bundling the first link MAC address and the second link MAC address under the first MLD MAC address.

In some aspects, the techniques described herein relate to a method including: at a multi-link device (MLD) configured for multi-link operation: establishing a first Internet Protocol (IP) stack configured with a first IP address that is associated to a first MLD media access control (MAC) address of a first station of the MLD; establishing a second IP stack that exists concurrently with the first IP stack and is configured with a second IP address associated to a second MLD MAC address of a second station of the MLD; and by a multi-link proxy layer implemented on the MLD and having interfaces to the first IP stack and the second IP stack, forwarding data traffic between an application and a peer MLD using one or more of (i) the first IP stack and the second MLD MAC address, and (ii) the second IP stack and the second MLD MAC address.

In some aspects, the techniques described herein relate to a method, further including: bundling a first link MAC address configured on a first physical interface and a second link MAC address configured on a second physical interface under one or more of the first MLD MAC address and the second MLD MAC address, wherein forwarding includes forwarding the data traffic using the first physical interface and the second physical interface.

In some aspects, the techniques described herein relate to a method, wherein: bundling includes respectively bundling the first link MAC address and the second link MAC address under the first MLD MAC address and the second MLD MAC address.

In some aspects, the techniques described herein relate to a method, further including: rotating the first MLD MAC address to a third MLD MAC address by disassociating the first MLD MAC address from the first IP address, and associating the third MLD MAC address to the first IP address in place of the first MLD MAC address.

In some aspects, the techniques described herein relate to a method, further including: rotating the second link MAC address to a third link MAC address by debundling the second link MAC address from the second MLD MAC address and bundling the third link MAC address to the third MLD MAC address.

In some aspects, the techniques described herein relate to a method, further including: bundling a third link MAC address configured on the second physical interface under the second link MAC address, such that the first MLD MAC address and the second MLD MAC address share the second physical interface.

In some aspects, the techniques described herein relate to a method, wherein the first IP stack, the second IP stack, the first IP address, and the second IP address each conform to a same type of IP, including one of IP version (v) 4 (IPv4) and IPv6.

In some aspects, the techniques described herein relate to a method, wherein the MLD is a non-access point (AP) MLD.

In some aspects, the techniques described herein relate to an apparatus including: one or more network input/output interfaces to communicate wirelessly; and a processor of a multi-link device (MLD) configured for multi-link operation, the processor coupled to the one or more network input/output interfaces and configured to perform: establishing a first Internet Protocol (IP) stack configured with a first IP address that is associated to a first MLD media access control (MAC) address of a first station of the MLD; establishing a second IP stack that exists concurrently with the first IP stack and is configured with a second IP address associated to a second MLD MAC address of a second station of the MLD; and by a multi-link proxy layer implemented on the MLD and having interfaces to the first IP stack and the second IP stack, forwarding data traffic between an application and a peer MLD using one or more of (i) the first IP stack and the second MLD MAC address, and (ii) the second IP stack and the second MLD MAC address.

In some aspects, the techniques described herein relate to an apparatus, wherein the processor is further configured to perform: bundling a first link MAC address configured on a first physical interface and a second link MAC address configured on a second physical interface under one or more of the first MLD MAC address and the second MLD MAC address, wherein the processor is configured to perform forwarding by forwarding the data traffic using the first physical interface and the second physical interface.

In some aspects, the techniques described herein relate to an apparatus, wherein: The processor is configured to perform bundling by respectively bundling the first link MAC address and the second link MAC address under the first MLD MAC address and the second MLD MAC address.

In some aspects, the techniques described herein relate to an apparatus, wherein the processor is further configured to perform: rotating the first MLD MAC address to a third MLD MAC address by disassociating the first MLD MAC address from the first IP address, and associating the third MLD MAC address to the first IP address in place of the first MLD MAC address.

In some aspects, the techniques described herein relate to an apparatus, wherein the processor is further configured to perform: rotating the second link MAC address to a third link MAC address by debundling the second link MAC address from the second MLD MAC address and bundling the third link MAC address to the third MLD MAC address.

In some aspects, the techniques described herein relate to an apparatus, wherein the processor is further configured to perform: bundling a third link MAC address configured on the second physical interface under the second link MAC address, such that the first MLD MAC address and the second MLD MAC address share the second physical interface.

In some aspects, the techniques described herein relate to an apparatus, wherein the first IP stack, the second IP stack, the first IP address, and the second IP address each conform to a same type of IP, including one of IP version (v) 4 (IPv4) and IPv6.

In some aspects, the techniques described herein relate to an apparatus, wherein the MLD is a non-access point (AP) MLD.

In some aspects, the techniques described herein relate to a non-transitory computer readable medium encoded with instructions that, when executed by a processor of a multi-link device (MLD) configured for multi-link operation, cause the processor to perform: establishing a first Internet Protocol (IP) stack configured with a first IP address that is associated to a first MLD media access control (MAC) address of a first station of the MLD; establishing a second IP stack that exists concurrently with the first IP stack and is configured with a second IP address associated to a second MLD MAC address of a second station of the MLD; and by a multi-link proxy layer implemented on the MLD and having interfaces to the first IP stack and the second IP stack, forwarding data traffic between an application and a peer MLD using one or more of (i) the first IP stack and the second MLD MAC address, and (ii) the second IP stack and the second MLD MAC address.

In some aspects, the techniques described herein relate to a non-transitory computer readable medium, further including instructions to cause the processor to perform: bundling a first link MAC address configured on a first physical interface and a second link MAC address configured on a second physical interface under one or more of the first MLD MAC address and the second MLD MAC address, wherein the instructions to cause the processor to perform forwarding include instructions to cause the processor to perform forwarding the data traffic using the first physical interface and the second physical interface.

In some aspects, the techniques described herein relate to a non-transitory computer readable medium, wherein: the instructions to cause the processor to perform bundling include instructions to cause the processor to perform respectively bundling the first link MAC address and the second link MAC address under the first MLD MAC address and the second MLD MAC address.

In some aspects, the techniques described herein relate to a non-transitory computer readable medium, further including instructions to cause the processor to perform: rotating the first MLD MAC address to a third MLD MAC address by disassociating the first MLD MAC address from the first IP address, and associating the third MLD MAC address to the first IP address in place of the first MLD MAC address.

In some aspects, the techniques described herein relate to a non-transitory computer readable medium, further including instructions to cause the processor to perform: rotating the second link MAC address to a third link MAC address by debundling the second link MAC address from the second MLD MAC address and bundling the third link MAC address to the third MLD MAC address.

In some aspects, the techniques described herein relate to a non-transitory computer readable medium, further including instructions to cause the processor to perform: bundling a third link MAC address configured on the second physical interface under the second link MAC address, such that the first MLD MAC address and the second MLD MAC address share the second physical interface.

In some aspects, the techniques described herein relate to a non-transitory computer readable medium, wherein the first IP stack, the second IP stack, the first IP address, and the second IP address each conform to a same type of IP, including one of IP version (v) 4 (IPv4) and IPv6.

In some aspects, the techniques described herein relate to a non-transitory computer readable medium, wherein the MLD is a non-access point (AP) MLD.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
at a multi-link device configured for multi-link operation:
establishing a first Internet Protocol (IP) stack configured with a first IP address that is associated to a first multi-link device media access control (MAC) address of a first station of the multi-link device;
establishing a second IP stack that exists concurrently with the first IP stack and is configured with a second IP address associated to a second multi-link device MAC address of a second station of the multi-link device;
bundling a first link MAC address configured on a first physical interface and a second link MAC address configured on a second physical interface under one or more of the first multi-link device MAC address and the second multi-link device MAC address;
by a multi-link proxy layer implemented on the multi-link device with interfaces to the first IP stack and the second IP stack, forwarding data traffic between an application and a peer multi-link device using the first physical interface and the second physical interface and using one or more of (i) the first IP stack and the second multi-link device MAC address, or (ii) the second IP stack and the second multi-link device MAC address; and
rotating the first multi-link device MAC address to a third multi-link device MAC address.

2. The method of claim 1, further comprising:
by the multi-link proxy layer, load balancing the data traffic.

3. The method of claim 1, wherein:
the multi-link device and the peer multi-link device are extra high throughput devices.

4. The method of claim 1, wherein bundling includes respectively bundling the first link MAC address and the second link MAC address under the first multi-link device MAC address and the second multi-link device MAC address.

5. The method of claim 1, further comprising:
rotating the first multi-link device MAC address to the third multi-link device MAC address by disassociating the first multi-link device MAC address from the first IP address, and associating the third multi-link device MAC address to the first IP address in place of the first multi-link device MAC address.

6. The method of claim 5, further comprising:
rotating the second link MAC address to a third link MAC address by debundling the second link MAC address from the second multi-link device MAC address and bundling the third link MAC address to the third multi-link device MAC address.

7. The method of claim 1, further comprising:
bundling a third link MAC address configured on the second physical interface under the second link MAC address, such that the first multi-link device MAC address and the second multi-link device MAC address share the second physical interface.

8. The method of claim 1, wherein the first IP stack, the second IP stack, the first IP address, and the second IP address each conform to a same type of IP, including one of IP version (v) 4 (IPv4) and IPv6.

9. The method of claim 1, wherein the multi-link device is a non-access point (AP) multi-link device.

10. An apparatus comprising:
one or more network input/output interfaces to communicate wirelessly; and
a processor of a multi-link device configured for multi-link operation, the processor coupled to the one or more network input/output interfaces and configured to perform:
establishing a first Internet Protocol (IP) stack configured with a first IP address that is associated to a first multi-link device media access control (MAC) address of a first station of the multi-link device;
establishing a second IP stack that exists concurrently with the first IP stack and is configured with a second IP address associated to a second multi-link device MAC address of a second station of the multi-link device;
bundling a first link MAC address configured on a first physical interface and a second link MAC address configured on a second physical interface under one or more of the first multi-link device MAC address and the second multi-link device MAC address;
by a multi-link proxy layer implemented on the multi-link device with interfaces to the first IP stack and the second IP stack, forwarding data traffic between an application and a peer multi-link device using the first physical interface and the second physical interface and using one or more of (i) the first IP stack and the second multi-link device MAC address, or (ii) the second IP stack and the second multi-link device MAC address; and
rotating the first multi-link device MAC address to a third multi-link device MAC address.

11. The apparatus of claim 10, wherein:
the multi-link device and the peer multi-link device are extra high throughput devices.

12. The apparatus of claim 10, wherein the processor is configured to perform bundling by respectively bundling the first link MAC address and the second link MAC address under the first multi-link device MAC address and the second multi-link device MAC address.

13. The apparatus of claim 10, wherein the processor is further configured to perform:
rotating the first multi-link device MAC address to the third multi-link device MAC address by disassociating the first multi-link device MAC address from the first IP address, and associating the third multi-link device MAC address to the first IP address in place of the first multi-link device MAC address.

14. The apparatus of claim 13, wherein the processor is further configured to perform:
rotating the second link MAC address to a third link MAC address by debundling the second link MAC address from the second multi-link device MAC address and bundling the third link MAC address to the third multi-link device MAC address.

15. The apparatus of claim 10, wherein the processor is further configured to perform:
bundling a third link MAC address configured on the second physical interface under the second link MAC address, such that the first multi-link device MAC address and the second multi-link device MAC address share the second physical interface.

16. The apparatus of claim 10, wherein the first IP stack, the second IP stack, the first IP address, and the second IP address each conform to a same type of IP, including one of IP version (v) 4 (IPv4) and IPv6.

17. A non-transitory computer readable medium encoded with instructions that, when executed by a processor of a multi-link device configured for multi-link operation, cause the processor to perform:
establishing a first Internet Protocol (IP) stack configured with a first IP address that is associated to a first multi-link device media access control (MAC) address of a first station of the multi-link device;
establishing a second IP stack that exists concurrently with the first IP stack and is configured with a second IP address associated to a second multi-link device MAC address of a second station of the multi-link device;
bundling a first link MAC address configured on a first physical interface and a second link MAC address configured on a second physical interface under one or more of the first multi-link device MAC address and the second multi-link device MAC address;
by a multi-link proxy layer implemented on the multi-link device with interfaces to the first IP stack and the second IP stack, forwarding data traffic between an application and a peer multi-link device using the first physical interface and the second physical interface and using one or more of (i) the first IP stack and the second multi-link device MAC address, or (ii) the second IP stack and the second multi-link device MAC address; and
rotating the first multi-link device MAC address to a third multi-link device MAC address.

18. The non-transitory computer readable medium of claim 17, wherein:
the multi-link device and the peer multi-link device are extra high throughput devices.

19. The non-transitory computer readable medium of claim 17, wherein the instructions to cause the processor to perform bundling include instructions to cause the processor to perform respectively bundling the first link MAC address and the second link MAC address under the first multi-link device MAC address and the second multi-link device MAC address.

20. The non-transitory computer readable medium of claim 17, further comprising instructions to cause the processor to perform:
rotating the first multi-link device MAC address to the third multi-link device MAC address by disassociating the first multi-link device MAC address from the first IP address, and associating the third multi-link device MAC address to the first IP address in place of the first multi-link device MAC address.

* * * * *